US009544821B2

(12) United States Patent
Nishida et al.

(10) Patent No.: US 9,544,821 B2
(45) Date of Patent: *Jan. 10, 2017

(54) MOBILE COMMUNICATION SYSTEM

(71) Applicant: NEC Corporation, Tokyo (JP)

(72) Inventors: Katsutoshi Nishida, Tokyo (JP);
Takashi Koshimizu, Kanagawa (JP);
Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,364

(22) Filed: Nov. 7, 2014

(65) Prior Publication Data
US 2015/0063306 A1 Mar. 5, 2015

Related U.S. Application Data

(63) Continuation of application No. 13/389,654, filed as application No. PCT/JP2010/063654 on Aug. 11, 2010, now Pat. No. 8,908,642.

(30) Foreign Application Priority Data

Aug. 12, 2009 (JP) .................................. 2009-187564
Aug. 24, 2009 (JP) .................................. 2009-193716

(51) Int. Cl.
H04W 4/00 (2009.01)
H04W 36/00 (2009.01)
(Continued)

(52) U.S. Cl.
CPC ........ *H04W 36/0022* (2013.01); *H04L 65/103* (2013.01); *H04L 65/104* (2013.01); *H04W 88/06* (2013.01); *H04L 65/1016* (2013.01)

(58) Field of Classification Search
None
See application file for complete search history.

(56) References Cited

U.S. PATENT DOCUMENTS 8,520,682 B2   8/2013  Mahdi
8,908,642 B2 * 12/2014  Nishida et al. ............... 370/331
(Continued)

FOREIGN PATENT DOCUMENTS

CN   101480034 A    7/2009
GB     2439368 A   12/2007
(Continued)

OTHER PUBLICATIONS

Search Report issued in related European Application No. 14189349.5, mailed Nov. 25, 2014 (6 pages).
(Continued)

*Primary Examiner* — Anh-Vu Ly
(74) *Attorney, Agent, or Firm* — Osha Liang LLP

(57) ABSTRACT

A mobile communication system and method that includes a radio access system employing a first communication scheme supporting packet-switched communication and a radio access system employing a second communication scheme supporting both circuit-switched communication and the packet-switched communication. The mobile communication system is configured to switch between a first communication state and a second communication state realizing single radio voice call continuity (SRVCC). The first communication state is when a first mobile station visits the radio access system employing the first communication scheme, and performs voice communication with a second mobile station and packet communication by using packet-switched system. The second communication state is when the first mobile station visits the radio access system employing the second communication scheme, and performs voice communication with the second mobile station by (Continued)

using circuit-switched system, and performs packet communication with the second station by using the packet-switched system.

4 Claims, 21 Drawing Sheets

(51) Int. Cl.
*H04W 88/06* (2009.01)
*H04L 29/06* (2006.01)

(56) References Cited

U.S. PATENT DOCUMENTS

| | | | |
|---|---|---|---|
| 2006/0019659 A1 | 1/2006 | Rosenberg et al. | |
| 2006/0268781 A1 | 11/2006 | Svensson et al. | |
| 2007/0014281 A1 | 1/2007 | Kant | |
| 2007/0149166 A1 | 6/2007 | Turcotte et al. | |
| 2007/0195754 A1 | 8/2007 | Shaheen | |
| 2007/0197227 A1 | 8/2007 | Naqvi et al. | |
| 2008/0026752 A1 | 1/2008 | Flore et al. | |
| 2008/0080428 A1 | 4/2008 | Jappila et al. | |
| 2008/0267128 A1 | 10/2008 | Bennett et al. | |
| 2008/0291874 A1 | 11/2008 | Bae et al. | |
| 2009/0005048 A1 | 1/2009 | Bae et al. | |
| 2009/0036131 A1 | 2/2009 | Diachina et al. | |
| 2009/0086674 A1 | 4/2009 | Ejzak | |
| 2009/0097476 A1 | 4/2009 | Roux et al. | |
| 2010/0135246 A1* | 6/2010 | Hallental | H04W 36/0022 370/331 |
| 2011/0200011 A1* | 8/2011 | Rune | H04W 36/0022 370/331 |
| 2011/0274090 A1* | 11/2011 | Hallensal | H04W 36/0022 370/331 |

FOREIGN PATENT DOCUMENTS

| | | |
|---|---|---|
| WO | 2008/123509 A1 | 10/2008 |
| WO | 2009/044222 A1 | 4/2009 |
| WO | 2009/088331 A1 | 7/2009 |

OTHER PUBLICATIONS

Office Action issued in corresponding European Application No. 13171635.9, mailed Oct. 29, 2014, (4 pages).
Office Action issued in corresponding European Application No. 10808242.1, mailed Oct. 31, 2014 (7 pages).
Nokia Siemens Networks et al.; "SRVCC functionality for emergency calls"; 3GPP TSG-SA2 Meeting #73, S2-093756; Tallin, Estonia, May 11-15, 2009 (22 pages).
International Search Report w/translation from PCT/JP2010/063654 dated Nov. 9, 2010 (3 pages).
3GPP TSG SA WG2 Meeting #76, TD S2-097453; "New alternative X—HO enhancement by local anchoring"; NTT DoCoMo, NEC; San Jose Del Cabo, Mexico; Nov. 16-20, 2009 (7 pages).
3GPP TS 23.216 V9.0.0; "3rd Generation Partnership Project; Technical Specification Group Services and System Aspects; Single Radio Voice Call Continuity (SRVCC); Stage 2 (Release 9)"; Jun. 2009; pp. 23-29 (8 pages).
espacenet Abstract Publication WO2008123509A1 dated Oct. 16, 2008 (1 page).
Extended European Search Report in corresponding European Application No. 10808242.1-1857 / 2466969 dated Mar. 13, 2013 (6 pages).

Office Action in corresponding Australian application on No. 2013204938 dated May 27, 2013 (3 pages).
Extended European Search Report in corresponding European application No. 13171635.9 dated Jul. 9, 2013 (9 pages).
3GPP TS 23.216 V9.0.0, "3rd Generation Partnership Project; Technical Specification Group Services and System Aspects; Single Radio Voice Call Continuity (SRVCC); Stage 2 (Release 9)"; Jun. 2009 (40 pages).
Australian Office Action issued in Australian Patent Application No. 2010283277, mailing date Jan. 7, 2014 (3 pages).
European Office Action issued in European Patent Application No. 10 808 242.1, mailing date Feb. 14, 2014 (8 pages).
3GPP TSG SA WG2 Architecture—S2#58, S2-073105, "LTE-CS Voice Call Continuity Using CS-PS Handover, PCC and ICS," Huawei, Orlando, FL, USA, Jun. 25-29, 2007 (18 pages).
Office Action issued in counterpart Australian Patent Application No. 2013204938 dated Apr. 11, 2014 (4 pages).
Office Action issued in counterpart European Patent Application No. 13 171 635.9 dated May 8, 2014 (6 pages).
Suresh Krishnan et al., "An IETF-based Evolved Packaet System beyond the 3GPP Release 8", CTIA 2008 (6 pages).
3GPP TS 23.237 V9.1.0 (Jun. 2009) 3rd Generation Partnership Project; Technical Specification Group Services and Architecture; IP Multimedia Subsystem (IMS) Service Continuity; Stage 2 (Release 9) (88 pages).
3GPP TR 23.826 V0.4.0 (Jan. 2008) 3rd Generation Partnership Project; Technical Specification Group Services and System Aspects; Feasibility Study on Voice Call Continuity Support for Emergency Calls (Release 8) (48 pages).
3GPP TR 23.882 V1.15.0 (Feb. 2008) 3rd Generation Partnership Project; Technical Specification Group Services and System Aspects; 3GPP System Architecture Evolution: Report on Technical Options and Conclusions (Release 7) (240 pages).
Office Action issued in corresponding Russian Application No. 2013129779/08, mailed Jan. 21, 2015 (11 pages).
Office Action issued in corresponding Russian application No. 2013129779/08, mailed Jun. 11, 2015 (10 pages).
First Office Action issued in counterpart Chinese Application No. 201310159525.5, dated Oct. 10, 2015 (13 pages).
First Office Action issued in counterpart Chinese Application No. 201310159528.9, dated Oct. 10, 2015 (13 pages).
Summons to Attend Oral Proceedings in counterpart European Application No. 10808242.1 dated Oct. 15, 2015 (6 pages).
Summons to Attend Oral Proceedings in counterpart European Application No. 13171635.9 issued on Nov. 23, 2015 (6 pages).
Office Action issued in counterpart European Application 14189349.5, dated Oct. 21, 2015 (6 pages).
Office Action issued in corresponding European Application No. 14189349.5, mailed May 2, 2016 (5 pages).
Office Action issued in corresponding European Application No. 10808242.1, mailed Apr. 15, 2016 (3 pages).
Office Action issued in corresponding European Application No. 13171635.9, mailed Apr. 13, 2016 (3 pages).
Office Action issued in related U.S. Appl. No. 13/866,579, mailed Mar. 28, 2016 (11 pages).
Office Action issued in corresponding Peruvian Application No. 000193-2012, mailed Apr. 12, 2016 (9 pages).
Office Action issued in corresponding Canadian Patent Application No. 2770742, mailed Sep. 23, 2016 (4 pages).
Office Action issued in corresponding Peruvian Patent Application No. 000193-2012/DIN, mailed Sep. 6, 2016 (with translation) (12 pages).

* cited by examiner

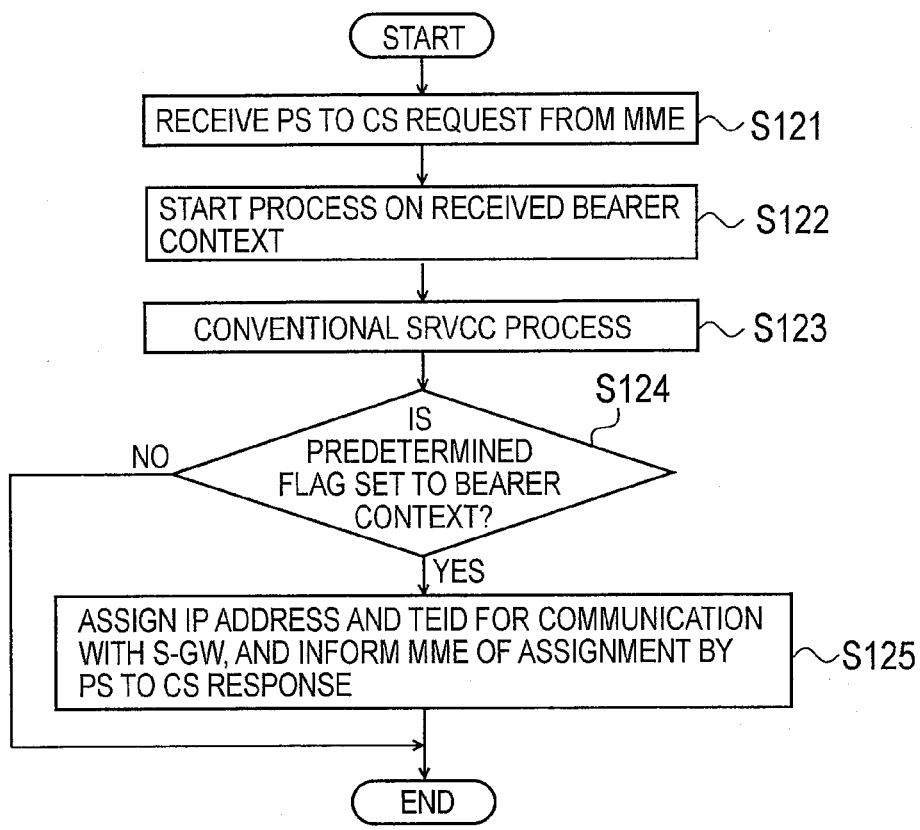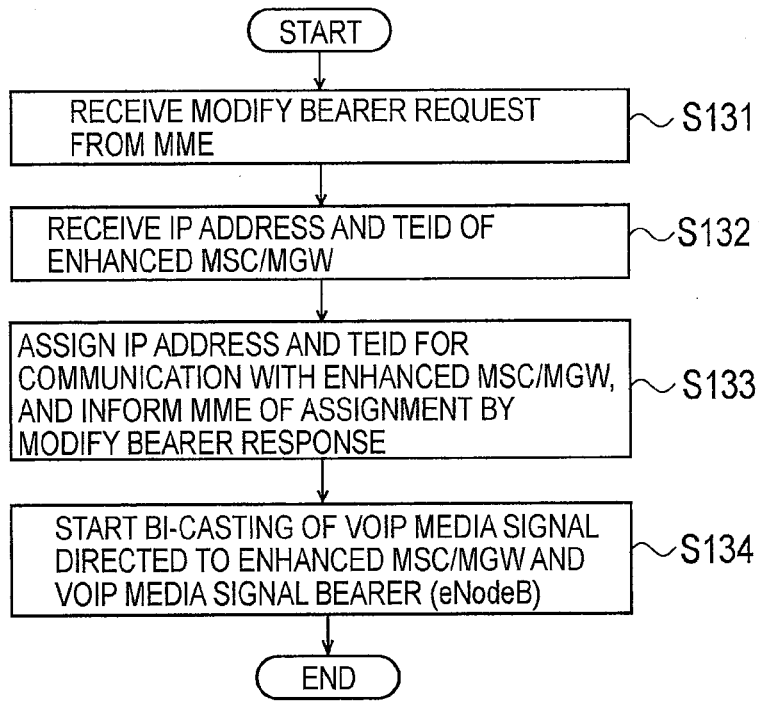

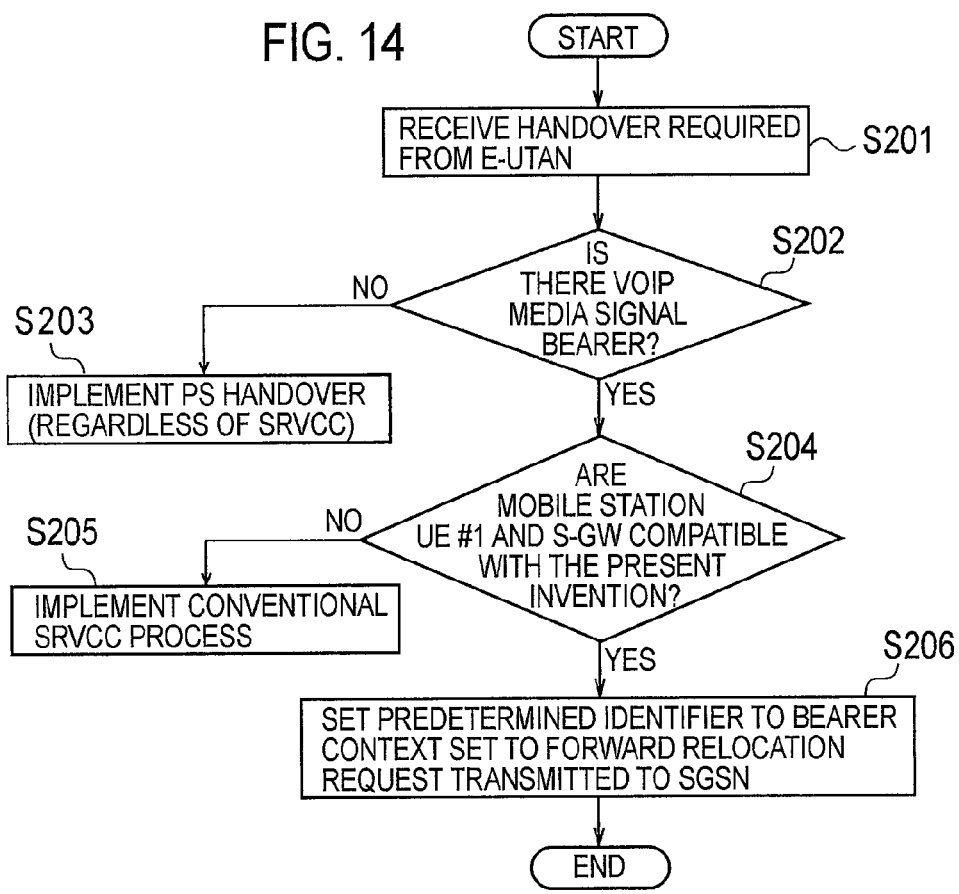
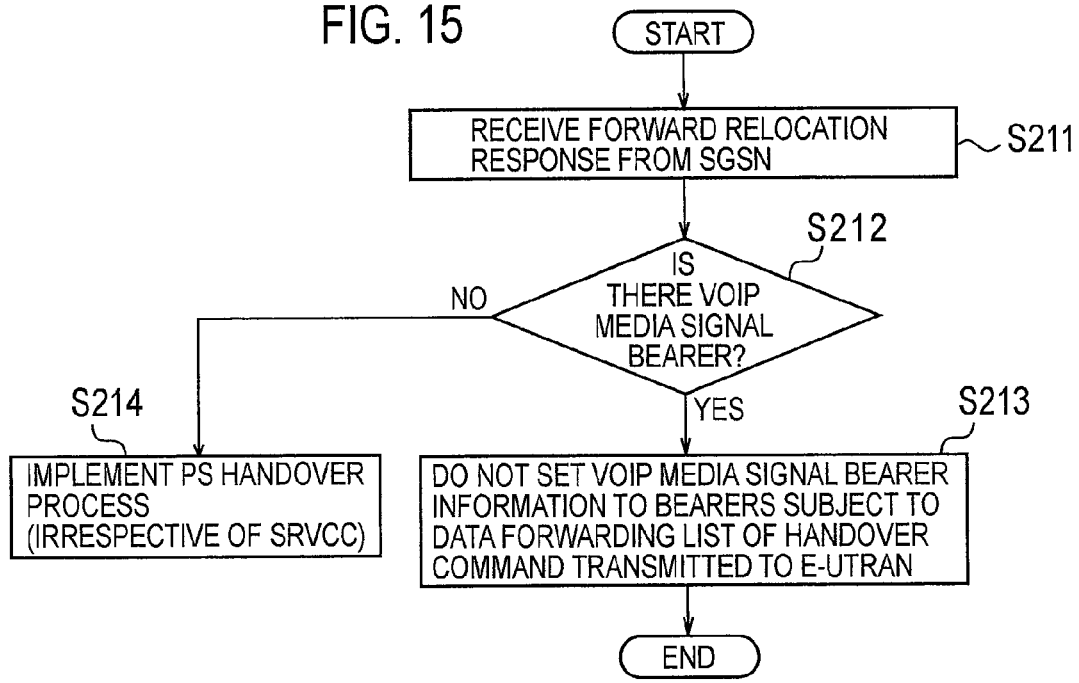

MOBILE COMMUNICATION SYSTEM

CROSS-REFERENCE TO RELATED APPLICATIONS

The present application is a continuation application of and, thereby, claims benefit under 35 U.S.C. §120 to U.S. patent application Ser. No. 13/389,654 filed on Feb. 9, 2012, which is a national stage application of PCT Application No. PCT/JP2010/063654, filed on Aug. 11, 2010, which claims priority to Japanese Patent Application Nos. 2009-187564 and 2009-193716 filed on Aug. 12, 2009 and Aug. 24, 2009, respectively. The contents of the priority applications are incorporated by reference in their entirety.

TECHNICAL FIELD

The present invention relates to a mobile communication system.

BACKGROUND ART

Conventionally, there has been known a mobile communication system capable of accommodating a 2G/3G radio access system and an LTE (Long Term Evolution) radio access system.

With reference to FIG. 25 and FIG. 26, an operation will be described, in which a mobile communication system switches a state (a first communication state) where a mobile station UE#1 performs voice communication (VoIP communication) with respect to a mobile station UE #2 via an LTE radio access system to a state (a second communication state) where the mobile station UE #1 performs voice communication (circuit-switched communication) with respect to the mobile station UE #2 via a 2G/3G radio access system, that is, an operation for realizing "SRVCC (Single Radio Voice Call Continuity)" defined in Non-Patent Document 1 will be described.

In step 1 in FIG. 25, the LTE radio access system (Source E-UTRAN) transmits a switching preparation instruction for the voice communication of the mobile station UE #1 to an enhanced MSC/MGW (Enhanced MSC Server Media Gateway for SRVCC) via a node MME (Mobility Management Entity, Source MME) (steps 3 to 5a in FIG. 26).

In step 2 in FIG. 25, the enhanced MSC/MGW transmits a resource preparation instruction for circuit-switched communication to a mobile switching center MSC (Mobile-service Switching Center, Target MSC) and the 2G/3G radio access system (Target RNC/BS), thereby preparing a resource for the voice communication (circuit-switched communication) of the mobile station UE #1 in an interval between the enhanced MSC/MGW and the 2G/3G radio access system (a switching destination) (steps 5b, 5c, 8a, 8b, and 8c in FIG. 26).

In step 3a in FIG. 25, the enhanced MSC/MGW transmits a switching request of a path of a VoIP media signal and a VoIP control signal to a node SCC AS (Service Centralization and Continuity Application Server) arranged in a home network of the mobile station UE #1 in IMS (IP Multimedia Subsystem) (step 9 in FIG. 26), and the node SCC AS transmits the switching request of the path of the VoIP media signal to the mobile station UE #2.

Furthermore, in step 3b in FIG. 25, the enhanced MSC/MGW notifies the LTE radio access system of the completion of the above-mentioned switching preparation, thereby transmitting a switching instruction from the LTE radio access system to the 2G/3G radio access system to the mobile station UE #1 (steps 12 to 14 in FIG. 26).

As a consequence, the VoIP media signal is switched from a state (a first communication state) where the VoIP media signal is exchanged between the mobile station UE #1 and the mobile station UE #2 via the LTE radio access system, a node S-GW (Serving-Gateway), and a node P-GW (a PDN-Gateway) to a state (a second communication state) where the VoIP media signal is exchanged between the enhanced MSC/MGW and the mobile station UE #2.

Furthermore, the VoIP control signal (SIP signal) is switched from a state (a first communication state) where the VoIP control signal is exchanged between the mobile station UE #1 and the mobile station UE #2 via the LTE radio access system, the node S-GW, the node P-GW, and the IMS to a state (a second communication state) where the VoIP control signal is exchanged between the enhanced MSC/MGW and the mobile station UE #2 via the IMS.

Thus, between the mobile station UE #1 and the enhanced MSC/MGW, a signal (hereinafter, referred to as a "circuit-switched signal") in circuit-switched communication including circuit-switched data and a control signal is exchanged via the 2G/3G radio access system. Here, the enhanced MSC/MGW is configured to convert the circuit-switched signal and a combination of the VoIP media signal and the VoIP control signal.

In addition, U plane data (hereinafter, referred to as a "packet signal"), other than the above-mentioned VoIP media signal and VoIP control signal, is switched from a state (a first communication state) where the packet signal is exchanged between the mobile station UE #1 and a packet communication network via the LTE radio access system, the node S-GW, and the node P-GW to a state (a second communication state) where the packet signal is exchanged between the mobile station UE #1 and the packet communication network via the 2G/3G radio access system, the node S-GW, and the node P-GW.

PRIOR ART DOCUMENT

Non-Patent Document

Non-Patent Document 1: 3GPP TS23.216, V9.0.0

However, the above-mentioned mobile communication system has a problem in that in the case of the switching from the first communication state to the second communication state, since a path switching request is transmitted to the mobile station UE #2, which is a communication partner of the mobile station UE #1, and the mobile station UE #2 performs path switching, when the mobile station UE #1 and the mobile station UE #2 visit networks different from each other, the time required for the switching may become long.

Another problem is that in the case of the above-mentioned switching, since a path switching process in the mobile station UE #1 and a path switching process in the mobile station UE #2 are performed in parallel, even when the path switching process in the mobile station UE #1 has been completed earlier, since a state (steps 9 to 16 in FIG. 26) where voice communication is not possible between the mobile station UE #1 and the mobile station UE #2 occurs until the path switching process in the mobile station UE #2 is completed, handover delay may occur.

In addition, in the above-mentioned mobile communication system, when the mobile station UE #1 has performed roaming, since the IMS located in the home network of the mobile station UE #1 and a circuit-switched domain (a 2G/3G core network and radio access system) located in a visited network of the mobile station UE #1 should perform the above-mentioned switching in cooperation with each other, both the home network of the mobile station UE #1 and the visited network of the mobile station UE #1 should have SRVCC support capability which is an optional function. Furthermore, it is necessary to perform a complicated procedure such as interworking tests or contract conclusion.

Moreover, in the above-mentioned mobile communication system, it may not be possible to perform the switching from the second communication state to the first communication state.

SUMMARY OF THE INVENTION

Therefore, the present invention has been achieved in view of the above-described problems, and an object thereof is to provide a mobile communication system which can realize SRVCC capable of continuously performing voice communication within a visited network of a mobile station UE #1 even when a first communication state and a second communication state are switched, and can solve problems of a conventional mobile communication system.

A first characteristic of the present invention is summarized as a mobile communication system which is provided with a radio access system employing a first communication scheme not supporting circuit-switched communication, a mobile delivery network accommodating the radio access system employing the first communication scheme, a radio access system employing a second communication scheme supporting the circuit-switched communication, a core network employing the second communication scheme and accommodating the radio access system employing the second communication scheme, and a service control network, and which is configured to switch between a first communication state and a second communication state; in a case of the first communication state, a first mobile station visits the radio access system employing the first communication scheme and configured to perform voice communication between the first mobile station and a second mobile station, and the configuration is such that a VoIP media signal is exchanged via the radio access system employing the first communication scheme and a serving gateway device arranged in a visited network of the first mobile station in the mobile delivery network and a VoIP control signal is exchanged via the radio access system employing the first communication scheme, the serving gateway device, and the service control network between the first mobile station and the second mobile station; and in a case of the second communication state, the first mobile station visits the radio access system employing the second communication scheme and is configured to perform voice communication between the first mobile station and the second mobile station, the configuration is such that a circuit-switched signal is exchanged between the first mobile station and a gateway device arranged in the core network employing the second communication scheme via the radio access system employing the second communication scheme, the VoIP media signal is exchanged between the second mobile station and the gateway device via the serving gateway device, the VoIP control signal is exchanged between the gateway device and the second mobile station via the serving gateway device and the service control network, and the gateway device converts the circuit-switched signal and a combination of the VoIP media signal and the VoIP control signal.

A second characteristic of the present invention is summarized as a mobile communication system which is provided with a radio access system employing a first communication scheme not supporting circuit-switched communication, a mobile delivery network accommodating the radio access system employing the first communication scheme, a radio access system employing a second communication scheme supporting the circuit-switched communication, a core network employing the second communication scheme and accommodating the radio access system employing the second communication scheme, and a service control network, and which is configured to switch between a first communication state and a second communication state; in a case of the first communication state, a first mobile station visits the radio access system employing the first communication scheme and configured to perform voice communication between the first mobile station and a second mobile station, and the configuration is such that a VoIP media signal is exchanged via the radio access system employing the first communication scheme and a serving gateway device arranged in a visited network of the first mobile station in the mobile delivery network and a VoIP control signal is exchanged via the radio access system employing the first communication scheme, the serving gateway device, and the service control network between the first mobile station and the second mobile station; and in a case of the second communication state, the first mobile station visits the radio access system employing the second communication scheme and is configured to perform voice communication between the first mobile station and the second mobile station, the configuration is such that a circuit-switched signal is exchanged between the first mobile station and the serving gateway device via the radio access system employing the second communication scheme, the VoIP media signal is exchanged between the second mobile station and the serving gateway device, the VoIP control signal is exchanged between the first mobile station and the second mobile station via the radio access system employing the second communication scheme, the serving gateway device, and the service control network, and the serving gateway device converts the circuit-switched signal and the VoIP media signal.

As described above, according to the present invention, it is possible to provide a mobile communication system which can realize SRVCC capable of continuously performing voice communication within a visited network of a mobile station UE #1 even when a first communication state and a second communication state are switched, and can solve problems of a conventional mobile communication system.

BRIEF DESCRIPTION OF THE DRAWINGS

FIG. 6 is a flowchart illustrating an operation of an enhanced MSC/MGW according to the first embodiment of the present invention.

FIG. 7 is a flowchart illustrating an operation of SGW according to the first embodiment of the present invention.

FIG. 14 is a flowchart illustrating an operation of MME according to the first modification of the present invention.

FIG. 15 is a flowchart illustrating an operation of the MME according to the first modification of the present invention.

DETAILED DESCRIPTION (Mobile Communication System According to First Embodiment of the Present Invention)

With reference to FIG. 1 to FIG. 10, a mobile communication system according to a first embodiment of the present invention will be described.

Figure 1:
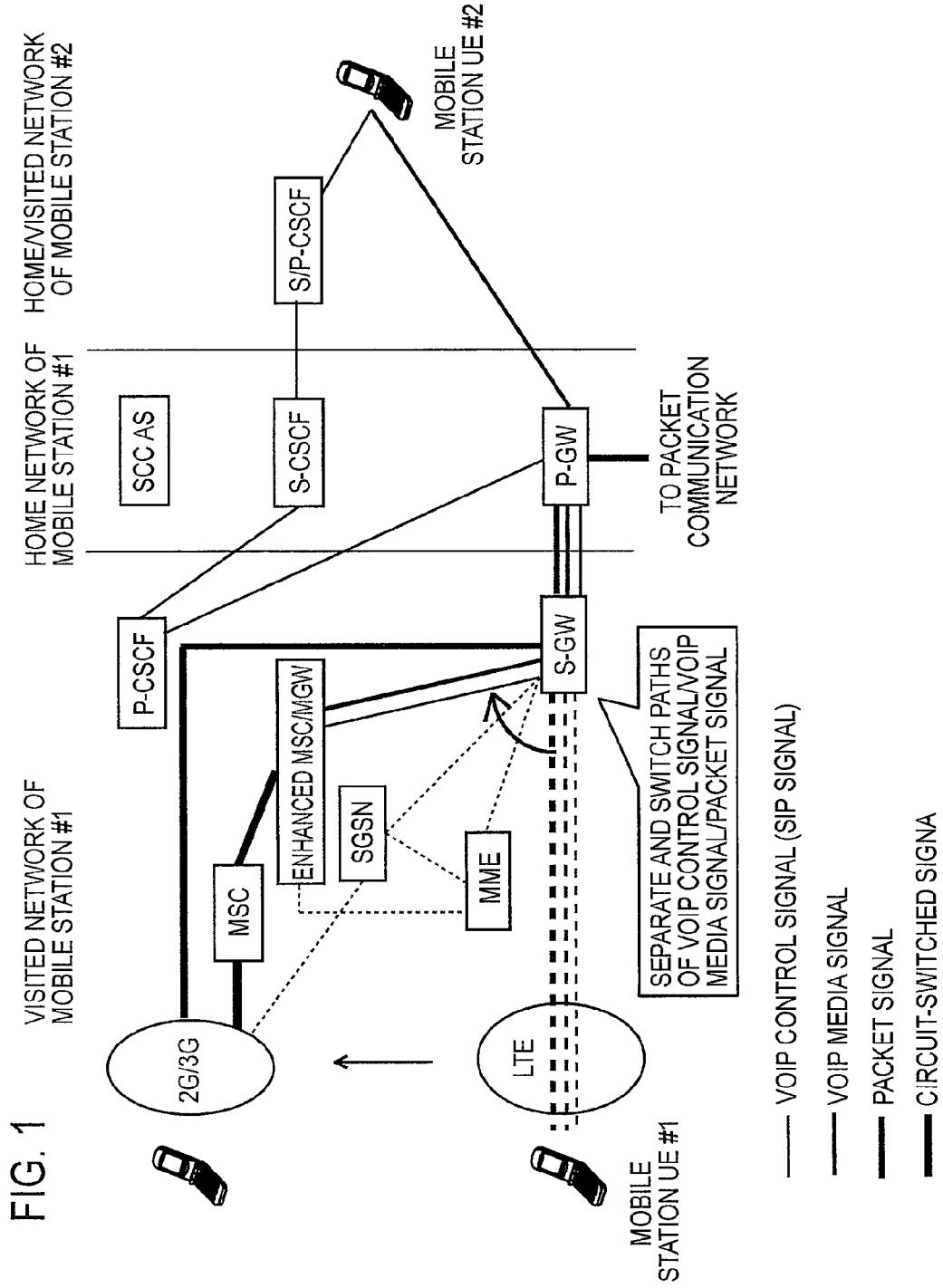
FIG. 1 is a diagram illustrating the entire configuration of a mobile communication system according to a first embodiment of the present invention.

As illustrated in FIG. 1, the mobile communication system according to the present embodiment includes an LTE radio access system, a 2G/3G radio access system, a mobile delivery network, a 2G/3G core network, a service control network, and a packet communication network.

The LTE radio access system includes a radio base station eNodeB (not illustrated), and the 2G/3G radio access system includes a radio base station NodeB (BS) (not illustrated) and a radio access control station RNC (not illustrated).

The mobile delivery network includes a node MME, a node S-GW (Serving Gateway device), and a node P-GW. Here, the node MME and the node S-GW are arranged in a visited network of a mobile station UE #1, and the node P-GW is arranged in a home network of the mobile station UE #1.

The 2G/3G core network includes a node MSC (a circuit mobile switching center), a node SGSN (a packet mobile switching center), or an enhanced MSC/MGW (a gateway node). Here, the node MSC, the node SGSN, and the enhanced MSC/MGW are arranged in the visited network of the mobile station UE #1.

The IMS includes a node P-CSCF (Proxy-Call Session Control Function), a node S-CSCF (Serving-Call Session Control Function), a node S/P-CSCF, and a node SCC AS.

In the mobile communication system according to the present embodiment, a VoIP media signal, a VoIP control signal, and a packet signal are exchanged as U plane data according to the mobile station UE #1.

The mobile communication system according to the present embodiment is configured to switch between a state (a first communication state) where the mobile station UE #1 performs voice communication (VoIP communication) with respect to the mobile station UE #2 via the LTE radio access system and a state (a second communication state) where the mobile station UE #1 performs voice communication (circuit-switched communication) with respect to the mobile station UE #2 via the 2G/3G radio access system and the enhanced MSC/MGW. That is, it is possible to realize SRVCC.

In the first communication state, the mobile station UE #1 (a first mobile station) visits the LTE radio access system, and is configured to perform the voice communication with respect to the mobile station UE #2 (a second mobile station).

Furthermore, in the first communication state, configuration is such that between the mobile station UE #1 and the mobile station UE #2, the VoIP media signal is exchanged via the LTE radio access system, the node S-GW, and the node P-GW, and the VoIP control signal is exchanged via the LTE radio access system, the node S-GW, the node P-GW, and the IMS.

Moreover, in the first communication state, configuration is such that between the mobile station UE #1 and the packet communication network, a packet signal is exchanged via the LTE radio access system, the node S-GW, and the node P-GW.

Meanwhile, in the second communication state, configuration is such that the mobile station UE #1 visits the 2G/3G radio access system, and performs the voice communication with respect to the mobile station UE #2.

Furthermore, in the second communication state, configuration is such that a 2G/3G circuit-switched signal is exchanged between the mobile station UE #1 and the enhanced MSC/MGW via the 2G/3G radio access system, the VoIP media signal is exchanged between the enhanced MSC/MGW and the mobile station UE #2 via the node S-GW and the node P-GW, and the VoIP control signal is exchanged between the enhanced MSC/MGW and the mobile station UE #2 via the node S-GW, the node P-GW, and the IMS.

Moreover, in the second communication state, configuration is such that between the mobile station UE #1 and the packet communication network, the packet signal is exchanged via the 2G/3G radio access system, the node SGSN, the node S-GW, and the node P-GW.

In addition, the enhanced MSC/MGW is configured to convert a 2G/3G circuit-switched signal (a combination of a voice format and a control signal) and a combination of the VoIP media signal and the VoIP control signal.

Figure 2:
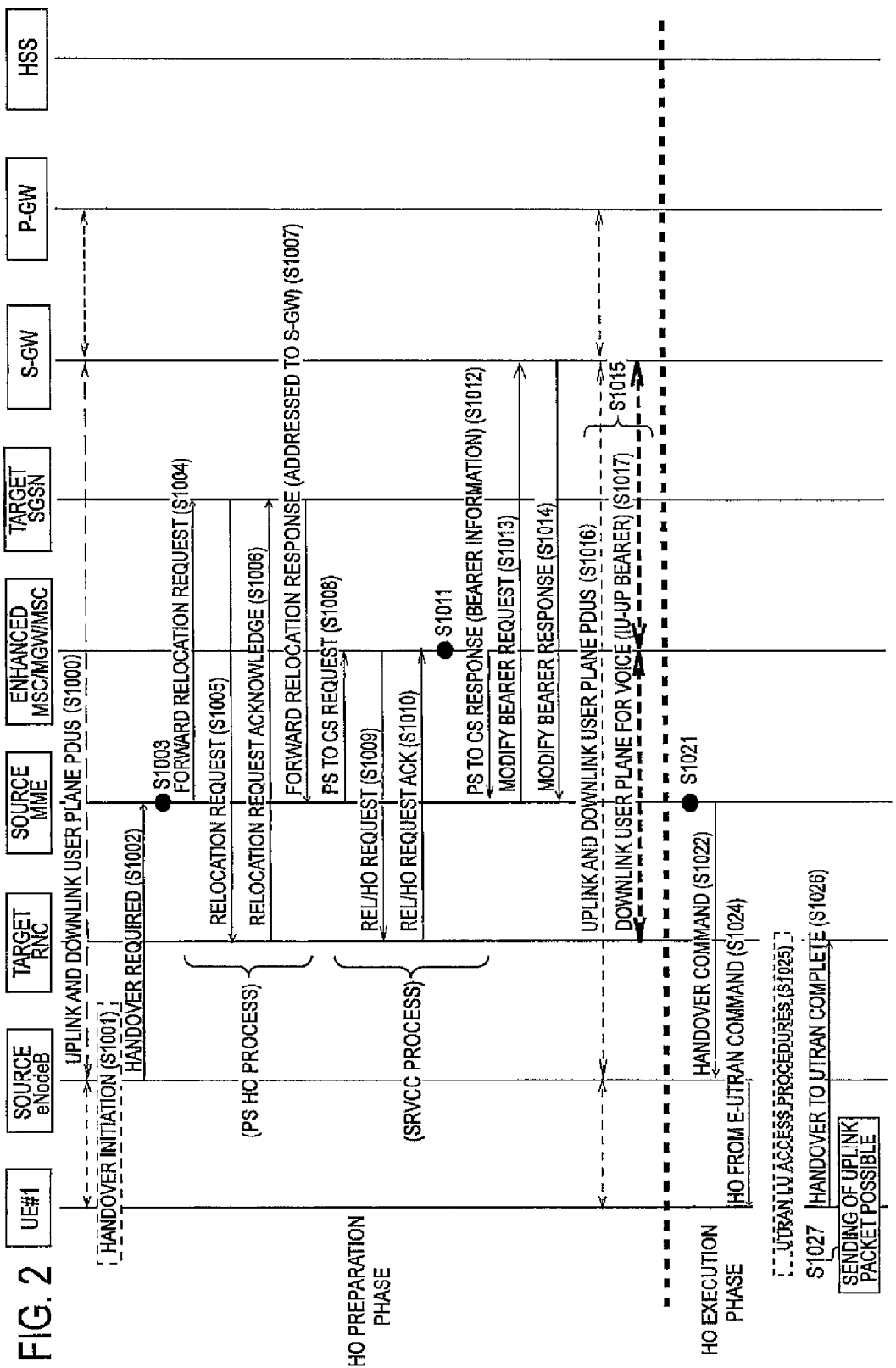
FIG. 2 is a sequence diagram illustrating an operation of the mobile communication system according to the first embodiment of the present invention.
Figure 3:
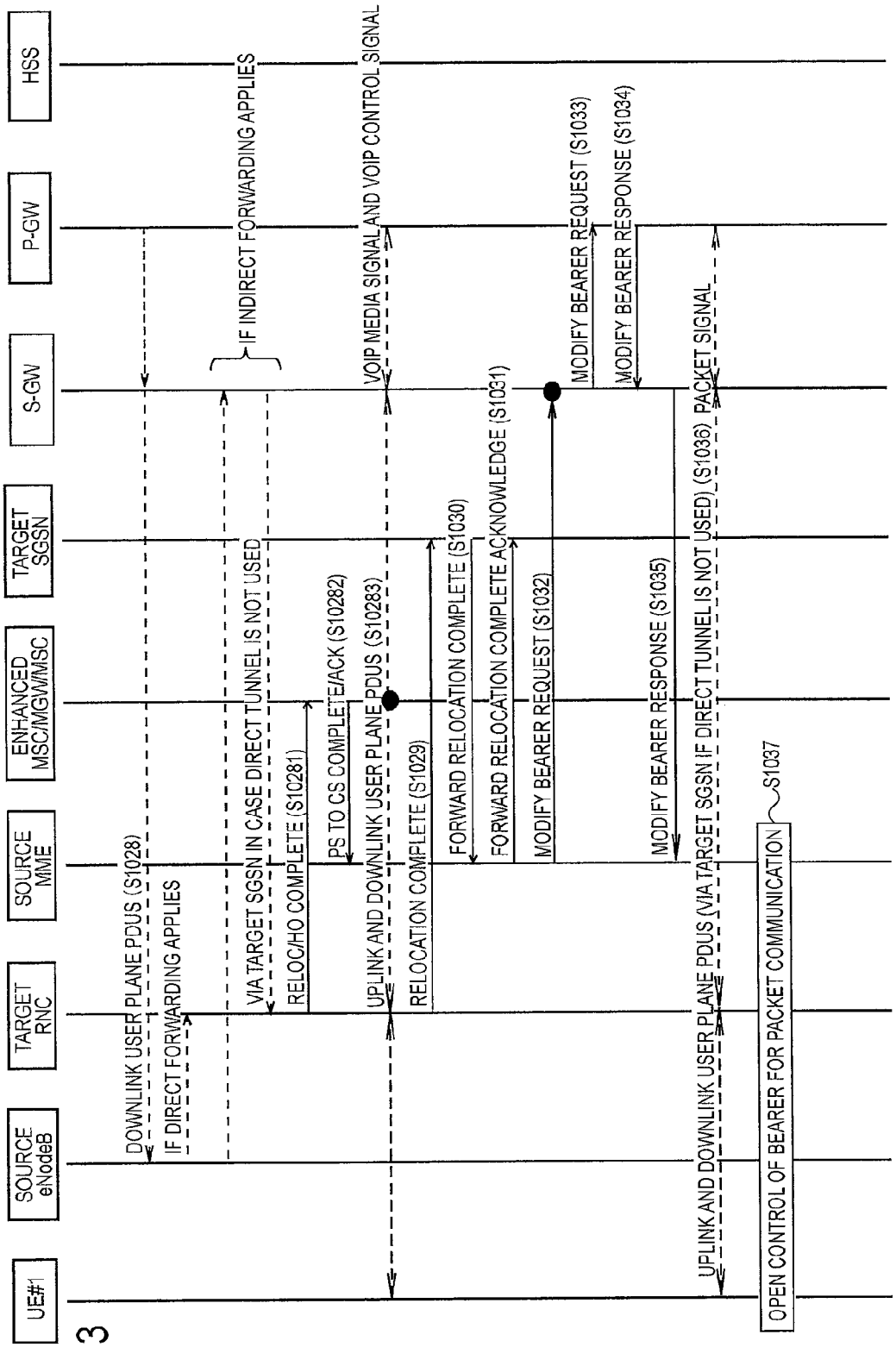
FIG. 3 is a sequence diagram illustrating an operation of the mobile communication system according to the first embodiment of the present invention.

With reference to FIG. 2 and FIG. 3, an operation of the mobile communication system according to the first embodiment of the present invention, specifically, an operation when the first communication state is switched to the second communication state in the mobile communication system according to the first embodiment of the present invention will be described.

As illustrated in FIG. 2, in step S1000, since the current state is the first communication state, the U plane data including the VoIP media signal, the VoIP control signal, and the packet signal is exchanged between the mobile station UE #1 and the node P-GW via the radio base station eNodeB and the node S-GW.

If a handover process of the mobile station UE #1 to the 2G/3G radio access system from the LTE radio access system starts between the mobile station UE #1 and the radio base station eNodeB in step S1001, the radio base station eNodeB transmits "Handover Required" to the node MME in step S1002.

In step S1003, the node MME determines whether the mobile station UE has SRVCC-compatible capability and the node S-GW has predetermined capability (capability compatible with the present invention).

Here, the predetermined capability includes "capability to start Bi-casting, which will be described later, when a predetermined trigger has been detected", or "capability to start the Bi-casting when uplink U plane data is received via a radio access system which is a switching destination".

When it is determined that the mobile station UE has the SRVCC-compatible capability and the node S-GW has the predetermined capability, the node MME transmits "Forward Relocation Request" including an IP address and TEID (Tunnel Endpoint Identifier) of the node S-GW to the node SGSN in step S1004.

In step S1005, the node SGSN transmits "Relocation Request" including the IP address and the TEID of the node S-GW to the radio access control station RNC, and in step S1006, the radio access control station RNC transmits "Relocation Request Acknowledge" to the node SGSN.

In step S1007, the node SGSN transmits "Forward Relocation Response", which is addressed to the node S-GW, to the node MME.

The operations of step S1004 to step S1007 are operations according to a handover process for a packet signal. That is, the handover process (a switching process) for the packet signal according to the mobile station UE #1 is performed via the node SGSN.

The node MME transmits "PS to CS Request" including the IP address and the TEID of the node S-GW to the enhanced MSC/MGW in step S1008, the enhanced MSC/MGW transmits "Rel/HO Request" including an IP address and TEID of the enhanced MSC/MGW to the radio access control station RNC in steps S1009, and the radio access control station RNC transmits "Rel/HO Ack" to the enhanced MSC/MGW in step S1010.

The enhanced MSC/MGW assigns the IP address and the TEID of the enhanced MSC/MGW-side for designating a bearer (a bearer for VoIP communication) used for the transfer of the VoIP media signal and the VoIP control signal for the mobile station UE #1 in step S1011, and transmits "PS to CS Response" including bearer information including the assigned IP address and TEID of the enhanced MSC/MGW-side to the node MME in step S1012.

In step S1013, the node MME transmits "Modify Bearer Request" for setting the above-mentioned bearer information to the node S-GW, and in step S1014, the node S-GW transmits "Modify Bearer Response" to the node MME.

In addition, in step S1013, the "Modify Bearer Request" may be transmitted from the enhanced MSC/MGW to the node S-GW, and in step S1014, the "Modify Bearer Response" may be transmitted from the node S-GW to the enhanced MSC/MGW.

In step S1015, the node S-GW starts an operation (that is, "the Bi-casting") for transmitting a downlink VoIP media signal and VoIP control signal to the radio base station eNodeB, and transmitting the VoIP media signal and the VoIP control signal to the radio access control station RNC via the enhanced MSC/MGW and the node MSC.

The node MME sets a VoIP bearer signal and the VoIP control signal not to be transferred to the node SGSN in step S1021, and transmits "Handover Command" to the radio base station eNodeB in step S1022.

The radio base station eNodeB transmits "HO from E-UTRAN Command" to the mobile station UE #1 in step S1024.

In step S1025, a procedure for establishing a radio access link is performed between the mobile station UE #1 and the radio access control station RNC, and in step S1026, the mobile station UE #1 transmits "Handover to UTRAN Complete" to the radio access control station RNC. In step S1027, the transmission of uplink U plane data to the radio access control station RNC from the mobile station UE #1 is possible.

As illustrated in FIG. 3, in the case in which "Direct Forwarding" is applied, if downlink U plane data is received in step S1028, the radio base station eNodeB transfers the downlink U plane data to the radio access control station RNC.

Meanwhile, in the case in which "Indirect Forwarding" is applied, if the downlink U plane data is received in step S1028, the radio base station eNodeB transfers the downlink U plane data to the radio access control station RNC via the node S-GW. Here, when "Direct Tunnel" is not used, the radio base station eNodeB transfers the downlink U plane data from the node S-GW to the radio access control station RNC via the node SGSN.

In step S10281, the radio access control station RNC transmits "Reloc/HO Complete" to the enhanced MSC/MGW, and in step S10282, "PS to CS Complete/Ack" is exchanged between the node MME and the enhanced MSC/MGW.

In step S10283, the VoIP media signal and the VoIP control signal are exchanged between the node P-GW and the enhanced MSC/MGW via the node S-GW, and the circuit-switched signal is switched to be exchanged between the mobile station UE #1 and the enhanced MSC/MGW via the radio access control station RNC. Here, the enhanced MSC/MGW performs codec conversion (RTP/AMR-Iu-UP/AMR) between the circuit-switched signal and a combination of the VoIP media signal and the VoIP control signal.

In addition, when the uplink VoIP media signal or VoIP control signal is received, the node S-GW stops the above-mentioned Bi-casting, that is, stops the transfer of the VoIP media signal or the VoIP control signal directed to the radio base station eNodeB.

In step S1029, the radio access control station RNC transmits "Relocation Complete" to the node SGSN.

In step S1030, the node SGSN transmits "Forward Relocation Complete" to the node MME, and in step S1031, the node MME transmits "Forward Relocation Complete Acknowledge" to the node SGSN.

In step S1032, the node MME transmits "Modify Bearer Request" to the node S-GW. Here, the node S-GW changes bearer information in response to the received "Modify Bearer Request", separates the VoIP media signal and the VoIP control signal from the packet signal, and changes a transfer destination.

In step S1033, the node S-GW transmits the "Modify Bearer Request" to the node P-GW, and in step S1034, the node P-GW transmits "Modify Bearer Response" to the node S-GW.

In step S1035, the node S-GW transmits the "Modify Bearer Response" to the node MME.

In step S1036, the packet signal is switched to be exchanged between the node P-GW and the mobile station UE #1 via the node S-GW, the node SGSN, and the radio access control station RNC.

In step S1037, open control of a bearer for packet communication used in the first communication state is performed between the mobile station UE #1 and the node MME.

Next, with reference to FIG. 4, an operation at the time of Attach or location registration in the mobile communication system according to the first embodiment of the present invention will be described.

Figure 4:
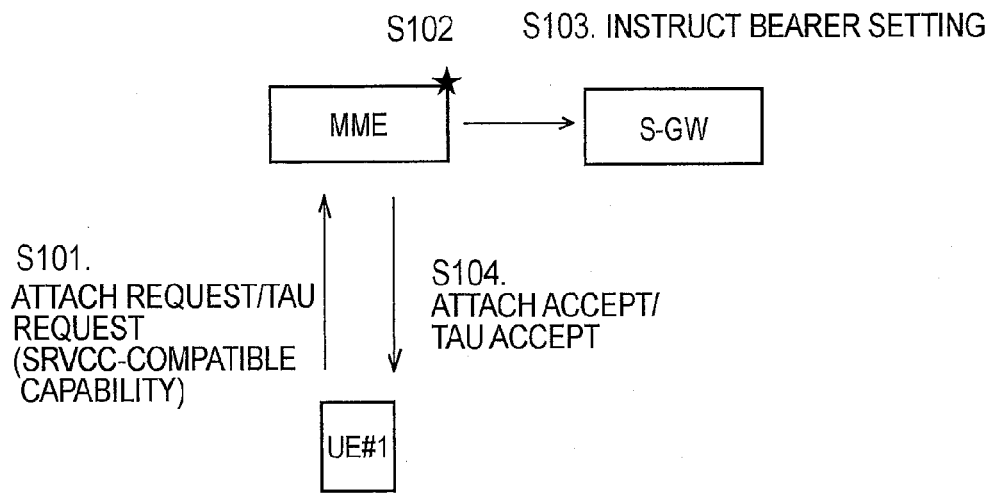
FIG. 4 is a diagram illustrating an operation at the time of Attach or location registration in the mobile communication system according to the first embodiment of the present invention.

As illustrated in FIG. 4, if the mobile station UE #1 transmits "Attach Request" or "Tracking Area Update Request", which includes information indicating the presence or absence of SRVCC-compatible capability, to the node MME in step S101, the node MME determines whether the mobile station UE #1 has the SRVCC-compatible capability based on the received "Attach Request" or "Tracking Area Update Request" in step S102.

When it is determined that the mobile station UE #1 has the SRVCC-compatible capability, the node MME selects a node S-GW having the above-mentioned predetermined capability and instructs the node S-GW to set a bearer for the mobile station UE in step S103.

In step S104, the node MME transmits "Attach Accept" or "Tracking Area Update Accept" to the mobile station UE #1.

Next, with reference to FIG. 5, an operation of the node MME according to the present embodiment will be described.

Figure 5:
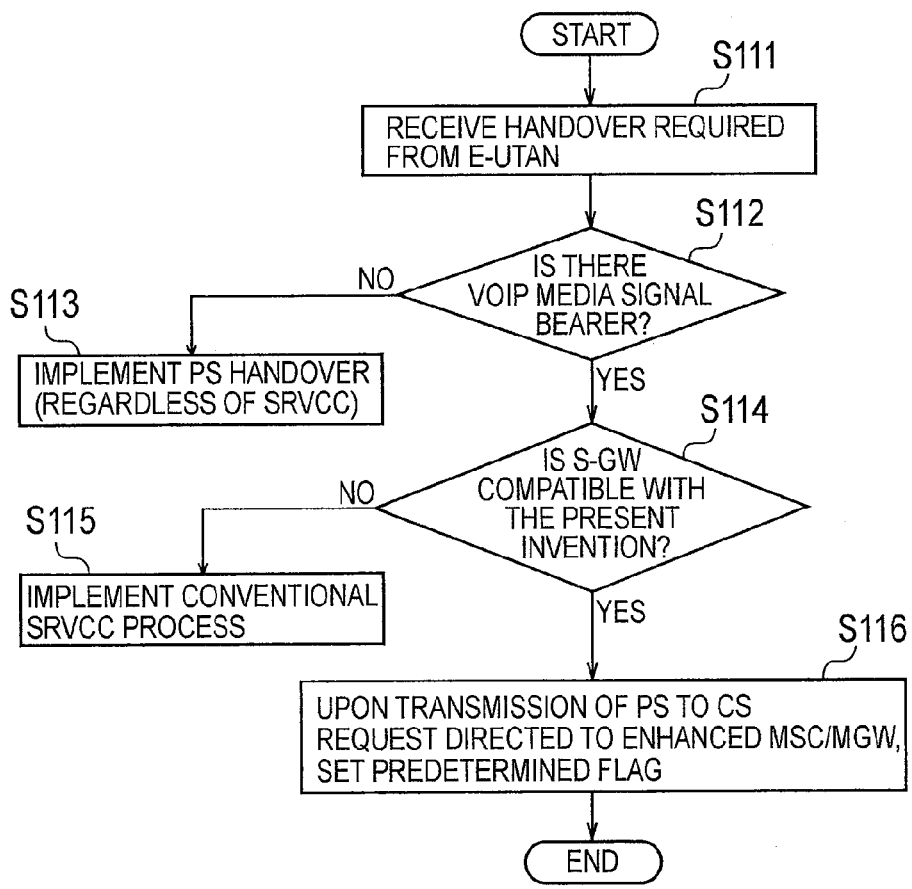
FIG. 5 is a flowchart illustrating an operation of MME according to the first embodiment of the present invention.

As illustrated in FIG. 5, if the "Handover Required" is received from the E-UTRAN in step S111, the node MME determines whether a bearer for the VoIP bearer signal has been set with reference to QCI (QoS Class Identifier) and the like in step S112.

When it is determined that the bearer for the VoIP bearer signal has not been set, the node MME performs a handover process according to typical packet communication, which is not associated with an SRVCC process, in step S113.

When it is determined that the bearer for the VoIP bearer signal has been set, the node MME determines whether the node S-GW is compatible with the present invention, that is, the node S-GW has predetermined capability (capability compatible with the present invention) in step S114.

When it is determined that the node S-GW is not compatible with the present invention, the node MME performs a conventional SRVCC process in step S115.

When it is determined that the node S-GW is compatible with the present invention, the node MME transmits "PS to CS Request", which includes a bearer context provided with a predetermined flag indicating that SRVCC according to the present invention is performed, to the enhanced MSC/MGW in step S116.

Next, with reference to FIG. 6, an operation of the enhanced MSC/MGW according to the present embodiment will be described.

As illustrated in FIG. 6, if the "PS to CS Request" is received from the node MME in step S121, the enhanced MSC/MGW starts a process for the bearer context included in the "PS to CS Request" in step S122, and performs the conventional SRVCC process in step S123.

In step S124, the enhanced MSC/MGW determines whether the predetermined flag has been set in the bearer context included in the "PS to CS Request".

When it is determined that the predetermined flag has been set, the present operation proceeds to step S125. When it is determined that the predetermined flag has not been set, the present operation ends.

In step S125, the enhanced MSC/MGW assigns bearer information (an IP address and TEID) for communication between the enhanced MSC/MGW and the node S-GW, and notifies the node MME of the bearer information through "PS to CS Response".

Next, with reference to FIG. 7, an operation 1 of the node S-GW according to embodiments of the present invention will be described.

As illustrated in FIG. 7, the node S-GW receives "Modify Bearer Request" from the node MME in step S131, and receives the IP address and the TEID of the enhanced MSC/MGW in step S132.

In step S133, the node S-GW assigns bearer information (an IP address and TEID) for communication between the node S-GW and the enhanced MSC/MGW, and notifies the node MME of the bearer information through "Modify Bearer Response".

In step S134, the node S-GW starts the Bi-casting of the VoIP media signal directed to the enhanced MSC/MGW and the radio base station eNodeB.

Next, with reference to FIG. 8, an operation 2 of the node S-GW according to embodiments of the present invention will be described.

Figure 8:
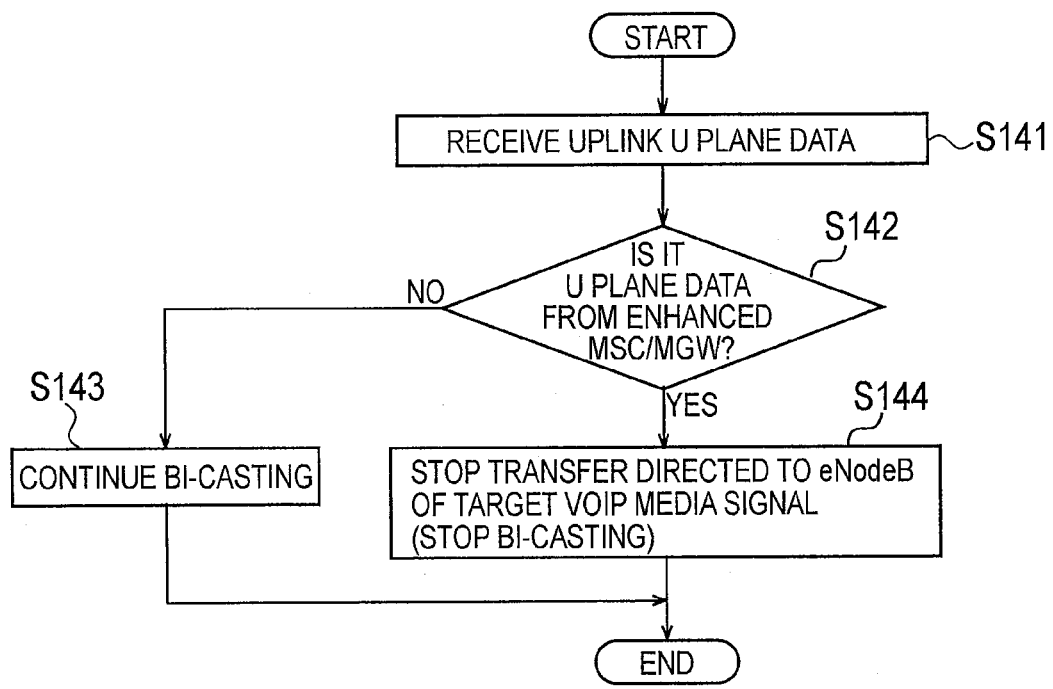
FIG. 8 is a flowchart illustrating an operation of the SGW according to the first embodiment of the present invention.

As illustrated in FIG. 8, if uplink U plane data is received in step S141, the node S-GW determines whether the U plane data is U plane data from the enhanced MSC/MGW in step S142.

When it is determined that the U plane data is not the U plane data from the enhanced MSC/MGW, the node S-GW continues the Bi-casting of the VoIP media signal directed to the enhanced MSC/MGW and the radio base station eNodeB in step S143.

Meanwhile, when it is determined that the U plane data is the U plane data from the enhanced MSC/MGW, the node S-GW stops the transfer of the VoIP media signal corresponding to the U plane data to the radio base station eNodeB, that is, the Bi-casting of the VoIP media signal directed to the enhanced MSC/MGW and the radio base station eNodeB in step S144.

Next, with reference to FIG. 9 and FIG. 10, an operation of the mobile communication system according to the first embodiment of the present invention, specifically, an operation when the second communication state is switched to the first communication state in the mobile communication system according to the first embodiment of the present invention will be described.

Figure 9:
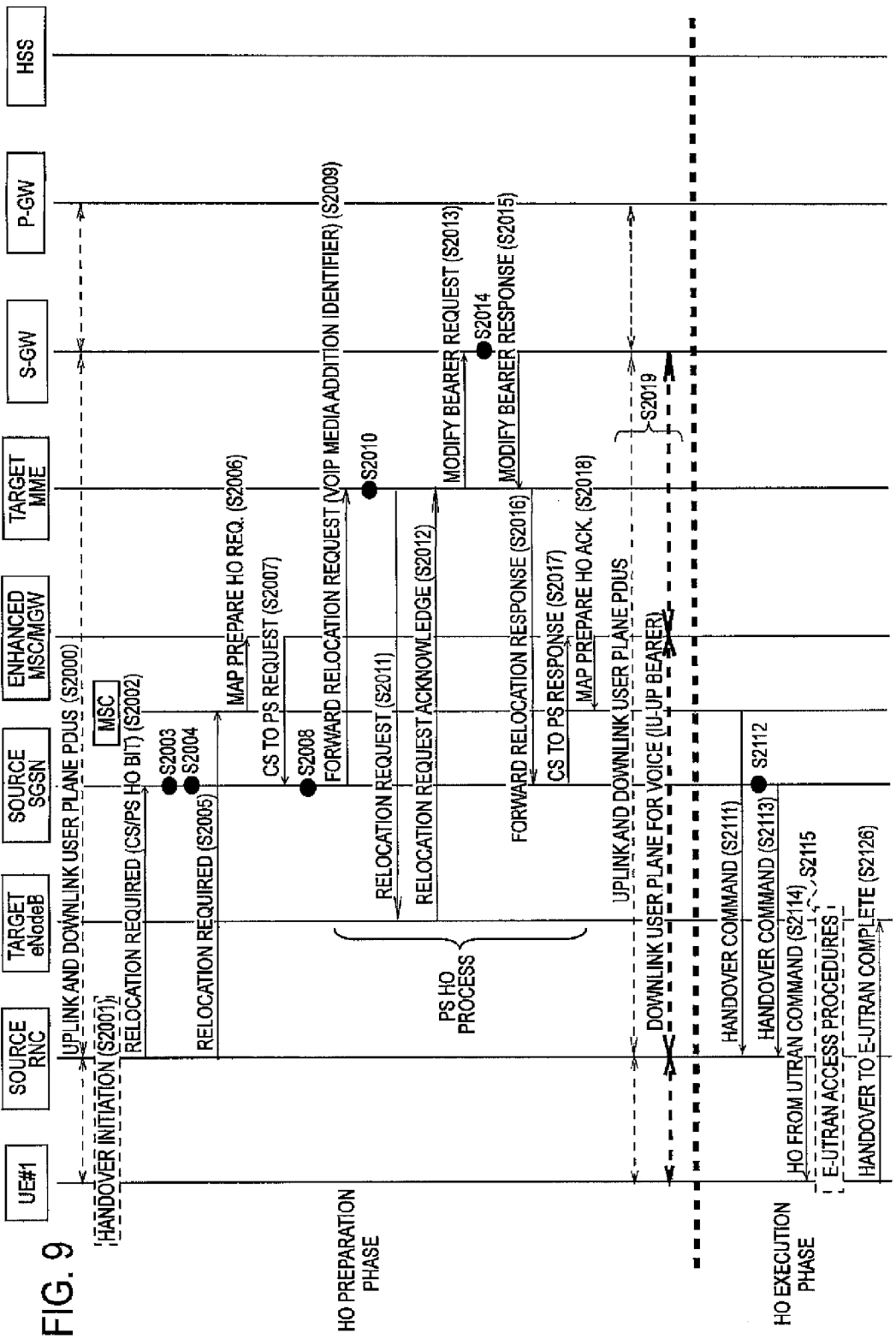
FIG. 9 is a sequence diagram illustrating an operation of the mobile communication system according to the first embodiment of the present invention.

As illustrated in FIG. 9, in step S2000, since the current state is the second communication state, U plane data is exchanged between the mobile station UE #1 and the node P-GW via the radio access control station RNC and the node S-GW.

If a handover process of the mobile station UE #1 to the LTE radio access system from the 2G/3G radio access system starts between the mobile station UE #1 and the radio access control station RNC in step S2001, the radio access control station RNC transmits "Relocation Required" including "CS/PS HO bit" to the node SGSN in step S2002.

In step S2003, the node SGSN determines whether the mobile station UE and the node MME are compatible with the present invention.

When it is determined that the mobile station UE and the node MME are compatible with the present invention, the node SGSN adds a bearer context for a VoIP media signal in step S2004.

The radio access control station RNC transmits "Relocation Required" to the node MSC in step S2005, the node MSC transmits "MAP Prepare HO req" to the enhanced MSC/MGW in step S2006, the enhanced MSC/MGW transmits "CS to PS Request" to the node SGSN in step S2007, and the node SGSN starts to create an EPS bearer for the VoIP media signal according to the mobile station UE #1 in step S2008.

In step S2009, the node SGSN transmits "Forward Relocation Request" including a VoIP media addition identifier to the node MME.

As described above, when "CS/PS HO bit" is included in the "Relocation Required" received in step S2002, or when it coincides with a predetermined determination logic, the node SGSN receives the "CS to PS Request" from the enhanced MSC/MGW and then transmits the "Forward Relocation Request" to the node MME.

In addition, when the "CS to PS Request" is not received from the enhanced MSC/MGW for a predetermined period, the node SGSN may perform only a handover process according to conventional packet communication.

The node MME adds the bearer context for the VoIP media signal based on the VoIP media addition identifier included in the received "Forward Relocation Request" in step S2010, and transmits "Relocation Request" to the radio base station eNodeB in step S2011.

In step S2012, the radio base station eNodeB transmits "Relocation Request Acknowledge" to the node MME, and in step S2013, the node MME transmits "Modify Bearer Request" to the node S-GW.

The node S-GW assigns an IP address and TEID to a bearer for the VoIP media signal in step S2014, and transmits "Modify Bearer Response" including the IP address and the TEID to the node MME in step S2015.

In step S2016, the node MME transmits "Forward Relocation Response" to the node SGSN, and in step S2017, the node SGSN transmits "CS to PS Response" to the enhanced MSC/MGW.

The operations of step S2009 to step S2017 are operations according to a handover process for a packet signal.

In step S2018, the enhanced MSC/MGW transmits "MAP Prepare HO ack" to the node MSC.

In step S2019, the node S-GW starts the Bi-casting of the VoIP media signal directed to the enhanced MSC/MGW and the radio base station eNodeB (the bearer for the VoIP media signal).

The node MSC transmits "Handover Command" to the radio access control station RNC in step S2111, and the node SGSN sets a VoIP bearer signal not to be transferred to the node MME in step S2112, and transmits the "Handover Command" to the radio access control station RNC in step S2113.

In step S2114, the radio access control station RNC transmits "HO from UTRAN Command" to the mobile station UE #1.

In step S2115, a procedure for establishing a radio access link is performed between the mobile station UE #1 and the radio base station eNodeB, and in step S2116, the mobile station UE #1 transmits "Handover to E-UTRAN Complete" to the radio access control station RNC.

Figure 10:
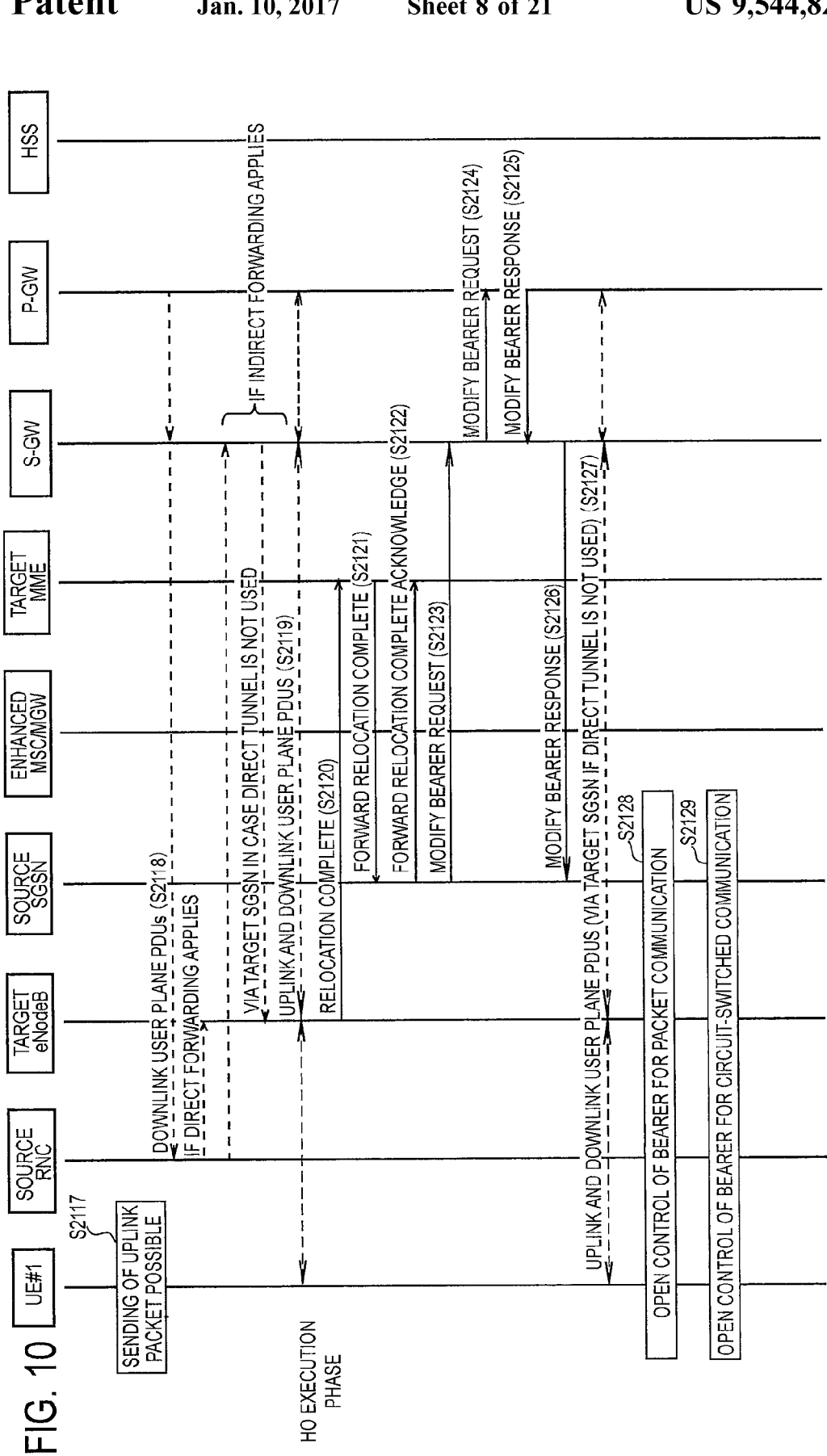
FIG. 10 is a sequence diagram illustrating an operation of the mobile communication system according to the first embodiment of the present invention.

As illustrated in FIG. 10, in step S2117, the transmission of uplink U plane data to the radio base station eNodeB from the mobile station UE #1 is possible.

In the case in which the "Direct Forwarding" is applied, if downlink U plane data is received in step S2118, the radio access control station RNC transfers the downlink U plane data to the radio base station eNodeB.

Meanwhile, in the case in which the "Indirect Forwarding" is applied, if the downlink U plane data is received in step S2118, the radio access control station RNC transfers the downlink U plane data to the radio base station eNodeB via the node S-GW. Here, when the "Direct Tunnel" is not used, the radio access control station RNC transfers the downlink U plane data from the node S-GW to the radio base station eNodeB via the node SGSN.

In step S2119, the U plane data is exchanged between the mobile station UE #1 and the node P-GW via the radio base station eNodeB and the node S-GW.

Here, if an uplink VoIP media signal is received, the node S-GW stops the above-mentioned Bi-casting and opens the bearer for the VoIP media signal directed to the enhanced MSC/MGW.

In step S2120, the radio base station eNodeB transmits "Relocation Complete" to the node MME.

In step S2121, the node MME transmits "Forward Relocation Complete" to the node SGSN, and in step S2122, the node SGSN transmits "Forward Relocation Complete Acknowledge" to the node MME.

In step S2123, the node SGSN transmits "Modify Bearer Request" to the node S-GW.

In step S2124, the node S-GW transmits the "Modify Bearer Request" to the node P-GW, and in step S2125, the node P-GW transmits "Modify Bearer Response" to the node S-GW.

In step S2126, the node S-GW transmits the "Modify Bearer Response" to the node SGSN.

In step S2127, a packet signal is switched to be exchanged between the node P-GW and the mobile station UE #1 via the node S-GW and the radio base station eNodeB.

In step S2128, open control of a bearer for packet communication used in the second communication state is performed between the mobile station UE #1 and the node SGSN, and in step S2129, open control of a bearer for circuit-switched communication used in the second communication state is performed between the mobile station UE #1 and the enhanced MSC/MGW.

In accordance with the mobile communication system according to the first embodiment of the present invention, a switching process of the first communication state and the second communication state can be realized within a visited network of the mobile station UE #1, a switching time for which communication is not possible can be reduced, and the switching process can be performed without control by the IMS.

As a consequence, since the above-mentioned switching process can be completely concealed for the home network of the mobile station UE #1 and the mobile station UE #2, the IMS arranged in the home network of the mobile station UE #1 does not require the SRVCC-compatible capability, and a complicated procedure is not required between the home network and the visited network of the mobile station UE #1.

Furthermore, in accordance with the mobile communication system according to the first embodiment of the present invention, the second communication state can be switched to the first communication state, and the opportunity to simultaneously use the packet communication and the voice communication using the LTE radio access system is increased, resulting in the improvement of a service quality.

(First Modification)

With reference to FIG. 11 to FIG. 21, a mobile communication system according to a first modification of the present invention will be described. Hereinafter, the mobile communication system according to the first modification of the present invention will be described while focusing on the difference from the above-mentioned mobile communication system according to the first embodiment.

Figure 11:
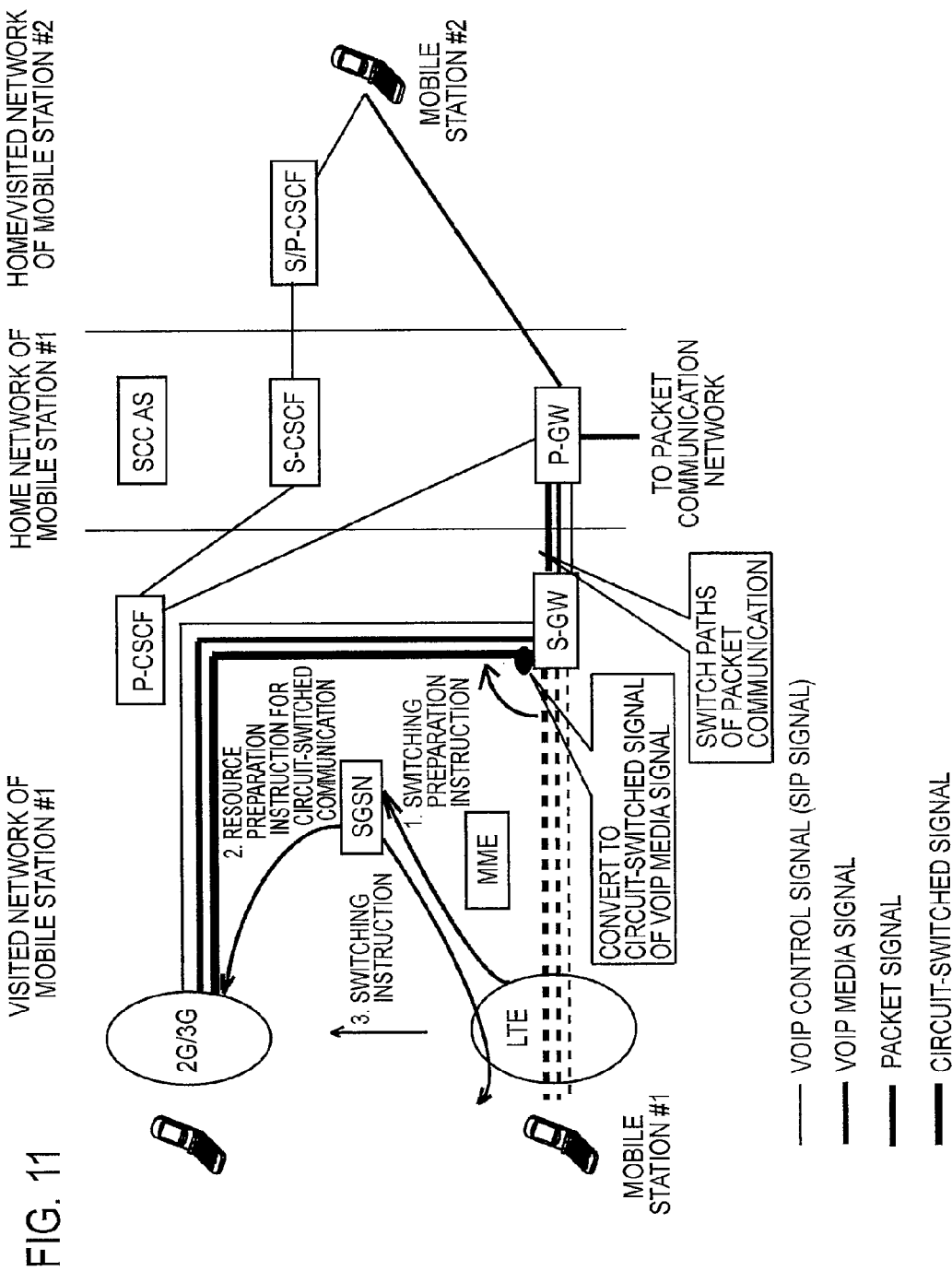
FIG. 11 is a diagram illustrating the entire configuration of a mobile communication system according to a first modification of the present invention.

As illustrated in FIG. 11, the mobile communication system according to the present first modification is not provided with the enhanced MSC/MGW.

In the first communication state, configuration is such that between the mobile station UE #1 and the mobile station UE #2, the VoIP media signal is exchanged via the LTE radio access system and the node S-GW.

Furthermore, in the first communication state, configuration is such that the VoIP control signal is exchanged via the LTE radio access system, the node S-GW, and the IMS.

In the second communication state, configuration is such that the circuit-switched signal is exchanged between the mobile station UE #1 and the node S-GW via the 2G/3G radio access system, the VoIP media signal is exchanged between the node S-GW and the mobile station UE #2, and the VoIP control signal is exchanged between the mobile station UE #1 and the mobile station UE #2 via the 2G/3G radio access system, the node S-GW, and the IMS.

Furthermore, in the second communication state, the node S-GW is configured to convert the circuit-switched signal and the VoIP media signal.

Figure 12:
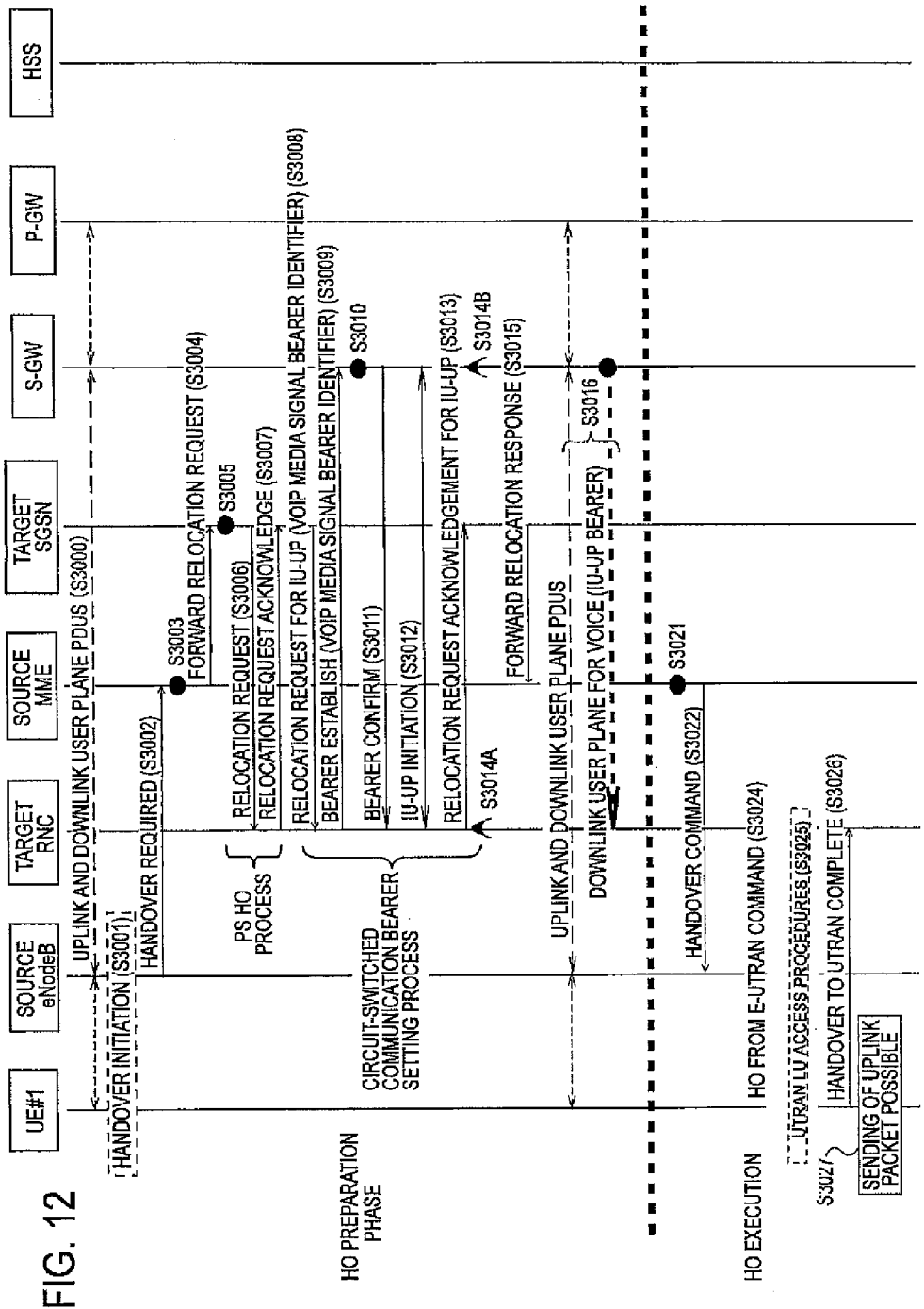
FIG. 12 is sequence diagram illustrating an operation of the mobile communication system according to the first modification of the present invention.
Figure 13:
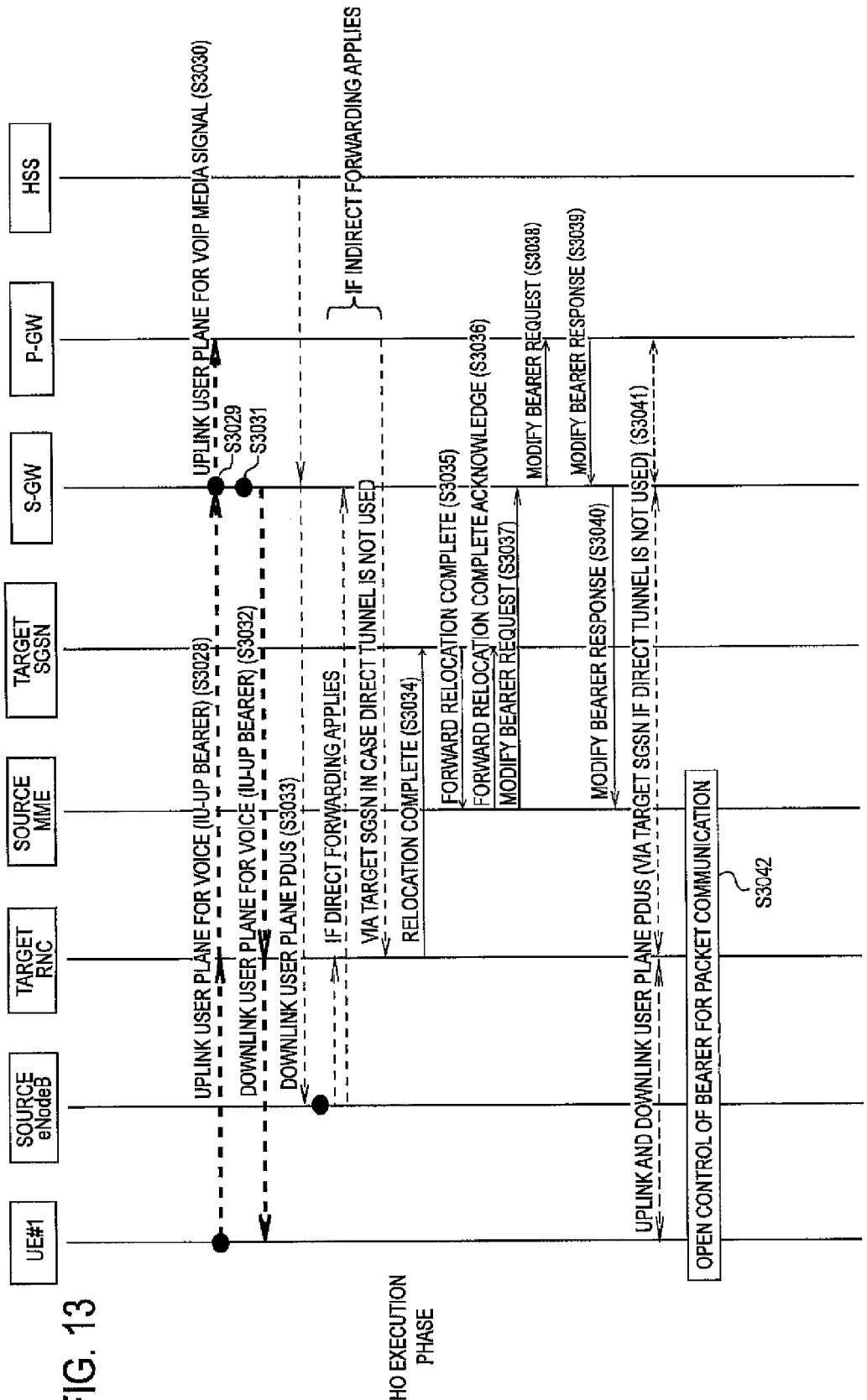
FIG. 13 is a sequence diagram illustrating an operation of the mobile communication system according to the first modification of the present invention.

With reference to FIG. 12 and FIG. 13, an operation of the mobile communication system according to the present first modification, specifically, an operation when the first communication state is switched to the second communication state in the mobile communication system according to the present first modification will be described.

As illustrated in FIG. 12, in step S3000, since the current state is the first communication state, the U plane data including the VoIP media signal, the VoIP control signal, and the packet signal is exchanged between the mobile station UE #1 and the node P-GW via the radio base station eNodeB and the node S-GW.

If a handover process of the mobile station UE #1 to the 2G/3G radio access system from the LTE radio access system starts between the mobile station UE #1 and the radio base station eNodeB in step S3001, the radio base station eNodeB transmits the "Handover Required" to the node MME in step S3002.

In step S3003, the node MME determines whether the mobile station UE has SRVCC-compatible capability and the node S-GW has predetermined capability (capability compatible with the present invention).

When it is determined that the mobile station UE and the node S-GW have the SRVCC-compatible capability, the node MME transmits "Forward Relocation Request" to the node SGSN in step S3004.

When it is determined that a bearer for the VoIP media signal exists in an MM context in step S3005, the node SGSN transmits "Relocation Request" to the radio access control station RNC in step S3006. In step S3007, the radio access control station RNC transmits "Relocation Request Acknowledge" to the node SGSN.

In step S3008, the node SGSN transmits "Relocation Request for Iu-UP" including a bearer identifier for the VoIP media signal to the radio access control station RNC, and in step S3009, the radio access control station RNC transmits "Bearer Establish" including the bearer identifier for the VoIP media signal to the node SGSN.

The node S-GW assigns the IP address and the port number of the node S-GW-side to an Iu-UP bearer in step S3010, and transmits "Bearer Confirm" to the radio access control station RNC in step S3011.

In step S3012, an initialization process of the Iu-UP bearer is performed between the node S-GW and the radio access control station RNC, and in step S3013, the radio access control station RNC transmits "Relocation Request Acknowledgement for Iu-UP" to the node SGSN.

As a consequence, the setting of the Iu-UP bearer in the radio access control station RNC is completed in step S3014A, and the setting of the Iu-UP bearer in the node S-GW is completed in step S3014B.

In step S3015, the node SGSN transmits "Forward Relocation Response", which is addressed to the node S-GW, to the node MME.

In step S3016, the node S-GW starts the Bi-casting of the VoIP media signal directed to the radio access control station RNC (the Iu-UP bearer) and the radio base station eNodeB (the bearer for the VoIP media signal). Here, the node S-GW performs codec conversion (RTP/AMR-Iu-UP/AMR) between the circuit-switched signal and the VoIP media signal.

The node MME sets the VoIP bearer signal not to be transferred to the node SGSN in step S3021, and transmits "Handover Command" to the radio base station eNodeB in step S3022.

The radio base station eNodeB transmits "HO from E-UTRAN Command" to the mobile station UE #1 in step S3024.

In step S3025, a procedure for establishing a radio access link is performed between the mobile station UE #1 and the radio access control station RNC, and in step S3026, the mobile station UE #1 transmits "Handover to UTRAN Complete" to the radio access control station RNC. In step S3027, the transmission of uplink U plane data to the radio access control station RNC from the mobile station UE #1 is possible.

As illustrated in FIG. 13, the mobile station UE #1 transmits the circuit-switched signal to the node S-GW via the radio access control station RNC (the Iu-UP bearer) in step S3028, and the node S-GW acquires a VoIP media signal by performing a codec conversion process with respect to the received circuit-switched signal in step S3029, and transmits the VoIP media signal to the node P-GW in step S3030.

The node S-GW stops the above-mentioned Bi-casting in step S3031 because the uplink U plane data has been received, and transmits a circuit-switched signal to the mobile station UE #1 via the radio access control station RNC (the Iu-UP bearer) in step S3032.

In the case in which the "Direct Forwarding" is applied, if downlink U plane data is received in step S3033, the radio base station eNodeB transfers the downlink U plane data to the radio access control station RNC.

Meanwhile, in the case in which the "Indirect Forwarding" is applied, if the downlink U plane data is received in step S3033, the radio base station eNodeB transfers the downlink U plane data to the radio access control station RNC via the node S-GW. Here, when "Direct Tunnel" is not used, the radio base station eNodeB transfers the downlink U plane data from the node S-GW to the radio access control station RNC via the node SGSN.

In step S3034, the radio access control station RNC transmits "Relocation Complete" to the node SGSN.

In step S3035, the node SGSN transmits "Forward Relocation Complete" to the node MME, and in step S3036, the node MME transmits "Forward Relocation Complete Acknowledge" to the node SGSN.

In step S3037, the node MME transmits "Modify Bearer Request" to the node S-GW.

In step S3038, the node S-GW transmits the "Modify Bearer Request" to the node P-GW, and in step S3039, the node P-GW transmits "Modify Bearer Response" to the node S-GW.

In step S3040, the node S-GW transmits the "Modify Bearer Response" to the node MME.

In step S3041, the VoIP control signal and the packet signal are switched to be exchanged between the node P-GW and the mobile station UE #1 via the node S-GW, the node SGSN, and the radio access control station RNC.

Here, the VoIP media signal is switched to be exchanged between the node S-GW and the node P-GW, and the circuit-switched signal is exchanged between the mobile station UE #1 and the node S-GW via the radio access control station RNC. Here, the node S-GW performs codec conversion (RTP/AMR-Iu-UP/AMR) between the circuit-switched signal and the VoIP media signal.

In step S3042, open control of a bearer for packet communication used in the first communication state is performed between the mobile station UE #1 and the node MME.

Next, with reference to FIG. 14, an operation 1 of the node MME according to the present first modification will be described.

As illustrated in FIG. 14, if the "Handover Required" is received from the E-UTRAN in step S201, the node MME determines whether a bearer for the VoIP bearer signal has been set with reference to QCI and the like in step S202.

When it is determined that the bearer for the VoIP bearer signal has not been set, the node MME performs a handover process according to typical packet communication, which is not associated with an SRVCC process, in step S203.

When it is determined that the bearer for the VoIP bearer signal has been set, the node MME determines whether the mobile station UE #1 and the node S-GW are compatible with the present invention, that is, the mobile station UE #1 and the node S-GW have a predetermined function (function according to the present invention) in step S204.

When it is determined that the mobile station UE #1 and the node S-GW are not compatible with the present invention, the node MME performs a conventional SRVCC process in step S205.

When it is determined that the mobile station UE #1 and the node S-GW are compatible with the present invention, the node MME transmits "Forward Relocation Request", which includes a bearer context provided with a predetermined identifier indicating that SRVCC according to the present invention is performed, to the node SGSN in step S206.

Next, with reference to FIG. 15, an operation 2 of the node MME according to the present first modification will be described.

As illustrated in FIG. 15, if the "Forward Relocation Response" is received from the node SGSN in step S211, the node MME determines whether the bearer for the VoIP bearer signal has been set with reference to QCI and the like in step S212.

When it is determined that the bearer for the VoIP bearer signal has not been set, the node MME performs a handover process according to typical packet communication, which is not associated with an SRVCC process, in step S213.

When it is determined that the bearer for the VoIP bearer signal has been set, the node MME does not set bearer information for the VoIP media signal in "Bearers Subject to Data Forwarding List" within "Handover command" to be transmitted to the E-UTRAN, in step S214.

Next, with reference to FIG. 16, an operation of the node SGSN according to the present first modification will be described.

Figure 16:
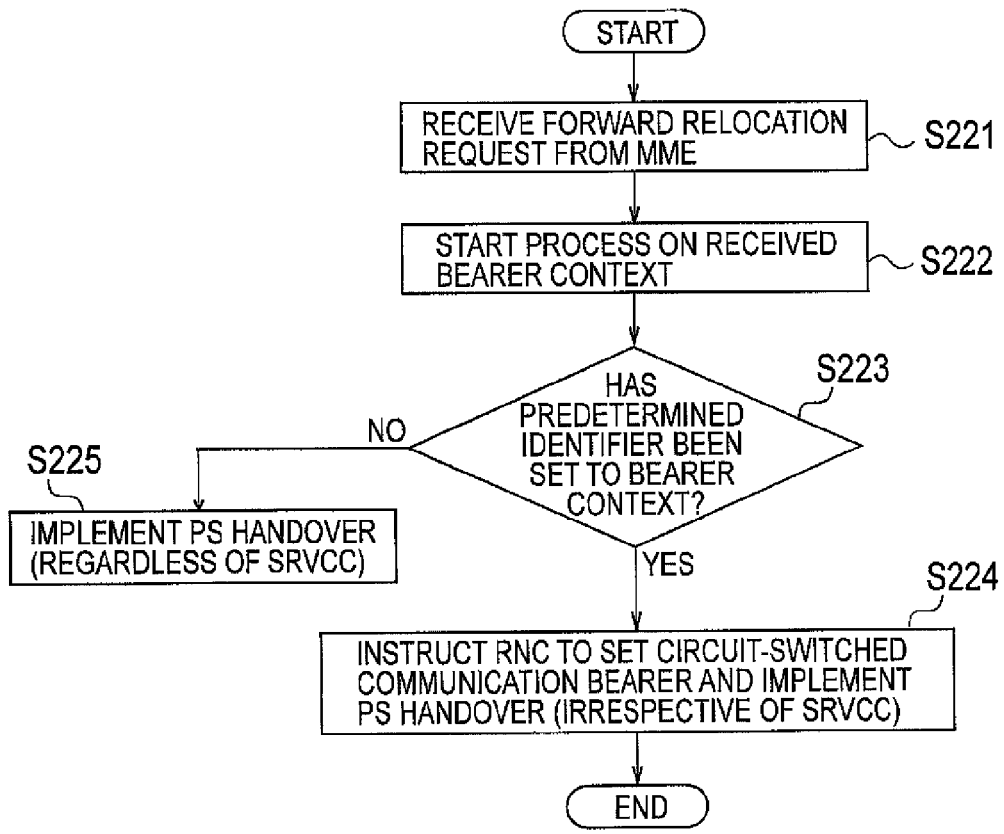
FIG. 16 is a flowchart illustrating an operation of SGSN according to the first modification of the present invention.

As illustrated in FIG. 16, if the "Forward Relocation Request" is received from the node MME in step S221, the node SGSN starts a process for the bearer context included in the "Forward Relocation Request" in step S222, and determines whether a predetermined identifier has been set in the bearer context included in the "Forward Relocation Request" in step S223.

When it is determined that the predetermined identifier has been set, the operation proceeds to step S224. When it is determined that the predetermined identifier has not been set, the operation proceeds to step S225.

In step S224, the node SGSN instructs the radio access control station RNC to set a bearer for circuit-switched communication, and performs a handover process according to typical packet communication, which is not associated with an SRVCC process.

In step S225, the node SGSN performs the handover process according to the typical packet communication, which is not associated with the SRVCC process.

Next, with reference to FIG. 17, an operation 1 of the node S-GW according to the present first modification will be described.

Figure 17:
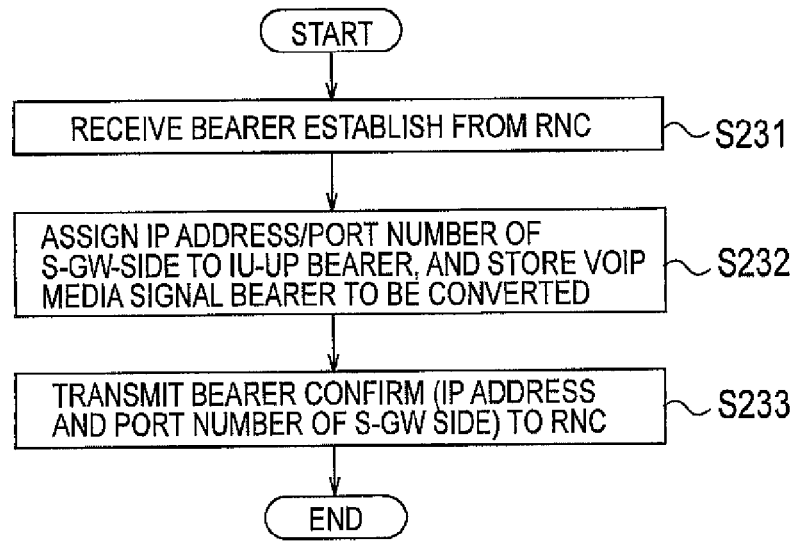
FIG. 17 is a flowchart illustrating an operation of SGW according to the first modification of the present invention.

As illustrated in FIG. 17, if the "Bearer Establish" is received from the radio access control station RNC in step S231, the node S-GW assigns the IP address and the port number of the node S-GW-side to the Iu-UP bearer and stores the bearer for the VoIP media signal, which is subject to codec conversion, in step S232.

In step S233, the node S-GW transmits "Bearer Confirm" including the IP address and the port number.

Next, with reference to FIG. 18, an operation 2 of the node S-GW according to the present first modification will be described.

Figure 18:
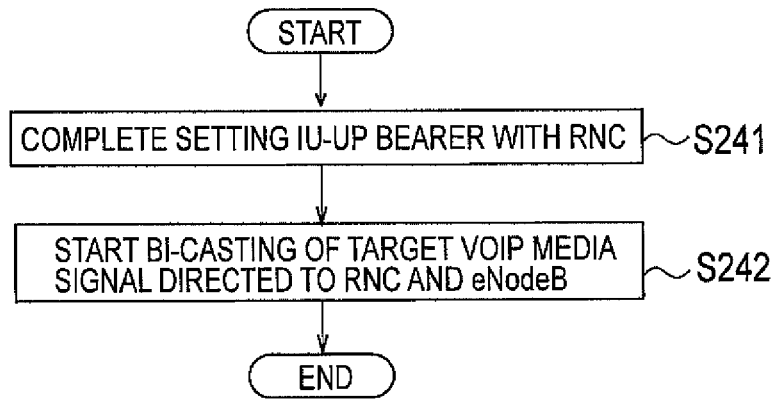
FIG. 18 is a flowchart illustrating an operation of the SGW according to the first modification of the present invention.

As illustrated in FIG. 18, if the setting of the Iu-UP bearer is completed between the node S-GW and the radio access control station RNC in step S241, the node S-GW starts the Bi-casting of the VoIP media signal directed to the radio access control station RNC and the radio base station eNodeB in step S242.

Next, with reference to FIG. 19, an operation 3 of the node S-GW according to the present first modification will be described.

Figure 19:
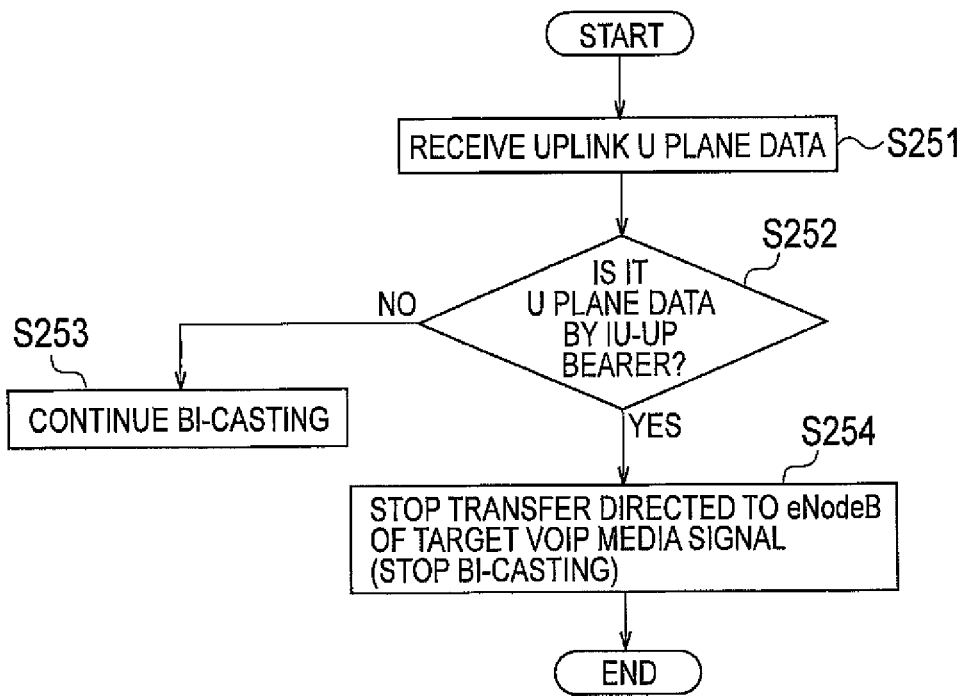
FIG. 19 is a flowchart illustrating an operation of the SGW according to the first modification of the present invention.

As illustrated in FIG. 19, if the uplink U plane data is received in step S251, the node S-GW determines whether the U plane data is U plane data received via Iu-UP in step S252.

When it is determined that the U plane data is not the U plane data received via the Iu-UP, the node S-GW continues the Bi-casting of the VoIP media signal directed to the radio access control station RNC and the radio base station eNodeB in step S253.

Meanwhile, when it is determined that the U plane data is the U plane data received via the Iu-UP, the node S-GW stops the transfer of the VoIP media signal corresponding to the U plane data to the radio base station eNodeB, that is, the Bi-casting of the VoIP media signal directed to the radio access control station RNC and the radio base station eNodeB in step S254.

Next, with reference to FIG. 20 and FIG. 21, an operation of the mobile communication system according to the present first modification, specifically, an operation when the second communication state is switched to the first communication state in the mobile communication system according to the present first modification will be described.

Figure 20:
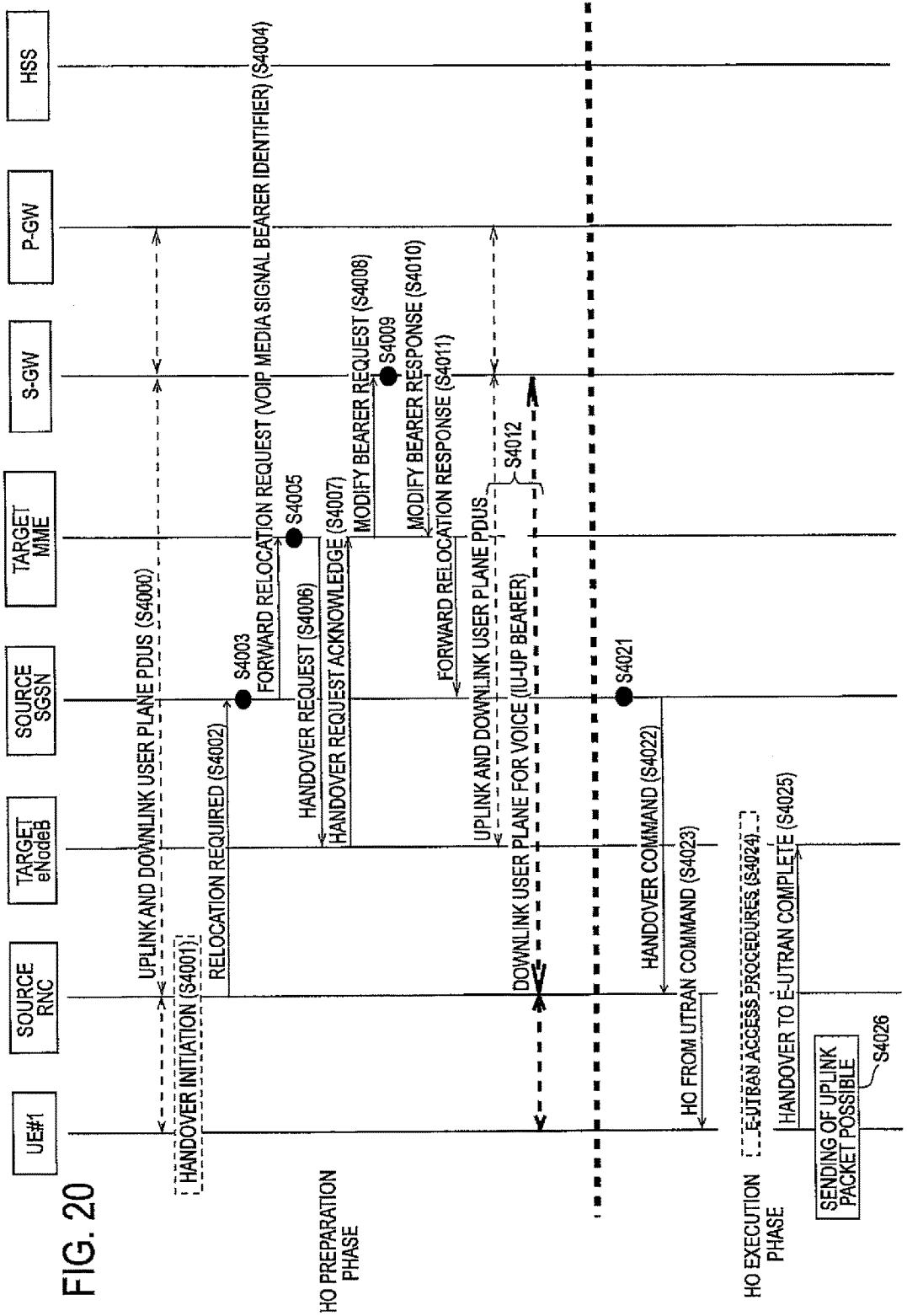
FIG. 20 is a sequence diagram illustrating an operation of the mobile communication system according to the first modification of the present invention.

As illustrated in FIG. 20, in step S4000, since the current state is the second communication state, the U plane data is exchanged between the mobile station UE #1 and the node P-GW via the radio access control station RNC and the node S-GW.

If a handover process of the mobile station UE #1 to the LTE radio access system from the 2G/3G radio access system starts between the mobile station UE #1 and the radio access control station RNC in step S4001, the radio access control station RNC transmits "Relocation Required" to the node SGSN in step S4002.

When it is determined that the mobile station UE and the node MME are compatible with the present invention, the node SGSN starts to create an EPS bearer for a VoIP media signal in step S4003.

In step S4004, the node SGSN transmits "Forward Relocation Request" including a bearer identifier for the VoIP media signal to the node MME.

The node MME adds the bearer context for the VoIP media signal based on the bearer identifier for the VoIP media signal included in the received "Forward Relocation Request" in step S4005, and transmits "Handover Request" to the radio base station eNodeB in step S4006.

In step S4007, the radio base station eNodeB transmits "Handover Request Acknowledge" to the node MME, and in step S4008, the node MME transmits "Modify Bearer Request" to the node S-GW.

The node S-GW assigns an IP address and TEID to a bearer for the VoIP media signal in step S4009, and transmits "Modify Bearer Response" including the IP address and the TEID to the node MME in step S4010.

In step S4011, the node MME transmits "Forward Relocation Response" to the node SGSN.

In step S4012, the node S-GW starts the Bi-casting of the VoIP media signal directed to the enhanced MSC/MGW and the radio base station eNodeB (the bearer for the VoIP media signal).

The node SGSN sets a VoIP bearer signal not to be transferred to the node MME in step S4021, and transmits "Handover Command" to the radio access control station RNC in step S4022.

In step S4023, the radio access control station RNC transmits "HO from UTRAN Command" to the mobile station UE #1.

In step S4024, a procedure for establishing a radio access link is performed between the mobile station UE #1 and the radio base station eNodeB, and in step S4025, the mobile station UE #1 transmits "Handover to E-UTRAN Complete" to the radio base station eNodeB.

In step S4026, the transmission of uplink U plane data to the radio base station eNodeB from the mobile station UE #1 is possible.

Figure 21:
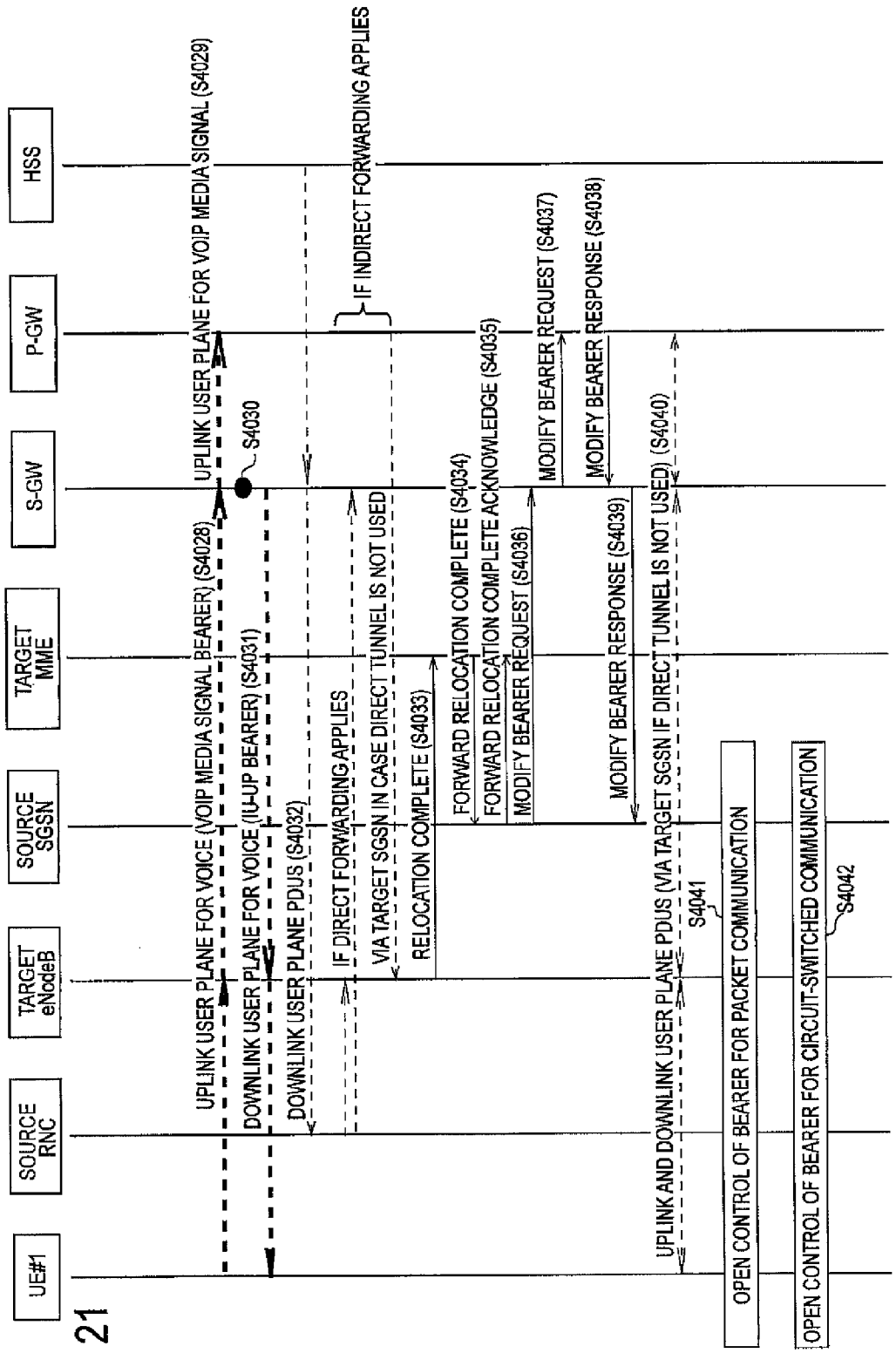
FIG. 21 is a sequence diagram illustrating an operation of the mobile communication system according to the first modification of the present invention.

As illustrated in FIG. 21, the mobile station UE #1 transmits the VoIP media signal and the VoIP control signal to the node S-GW via the radio base station eNodeB (the bearer for the VoIP media signal) in step S4028, and the node S-GW transmits the VoIP media signal to the node P-GW without performing a codec conversion process with respect to the received circuit-switched signal in step S4029.

The node S-GW stops the above-mentioned Bi-casting in step S4030 because the uplink U plane data has been received, opens the bearer for the VoIP media signal directed to the radio access control station RNC, and transmits a circuit-switched signal to the mobile station UE #1 via the radio base station eNodeB (the Iu-UP bearer) in step S4031.

In the case in which the "Direct Forwarding" is applied, if downlink U plane data is received in step S4032, the radio access control station RNC transfers the downlink U plane data to the radio base station eNodeB.

Meanwhile, in the case in which the "Indirect Forwarding" is applied, if the downlink U plane data is received in step S4032, the radio access control station RNC transfers the downlink U plane data to the radio base station eNodeB via the node S-GW. Here, when the "Direct Tunnel" is not used, the radio access control station RNC transfers the downlink U plane data from the node S-GW to the radio base station eNodeB via the node SGSN.

In step S4033, the radio access control station RNC transmits "Relocation Complete" to the node SGSN.

In step S4034, the node SGSN transmits "Forward Relocation Complete" to the radio base station eNodeB, and in step S4035, the radio base station eNodeB transmits "Forward Relocation Complete Acknowledge" to the node SGSN.

In step S4036, the node SGSN transmits "Modify Bearer Request" to the node S-GW.

In step S4037, the node S-GW transmits the "Modify Bearer Request" to the node P-GW, and in step S4038, the node P-GW transmits "Modify Bearer Response" to the node S-GW.

In step S4039, the node S-GW transmits the "Modify Bearer Response" to the node SGSN.

In step S4040, a packet signal is switched to be exchanged between the node P-GW and the mobile station UE #1 via the node S-GW and the radio base station eNodeB.

In step S4041, open control of a bearer for packet communication used in the second communication state is performed between the mobile station UE #1 and the node SGSN, and in step S4042, open control of a bearer for circuit-switched communication used in the second communication state is performed between the mobile station UE #1 and the node S-GW.

(Second Modification)

Figure 22:
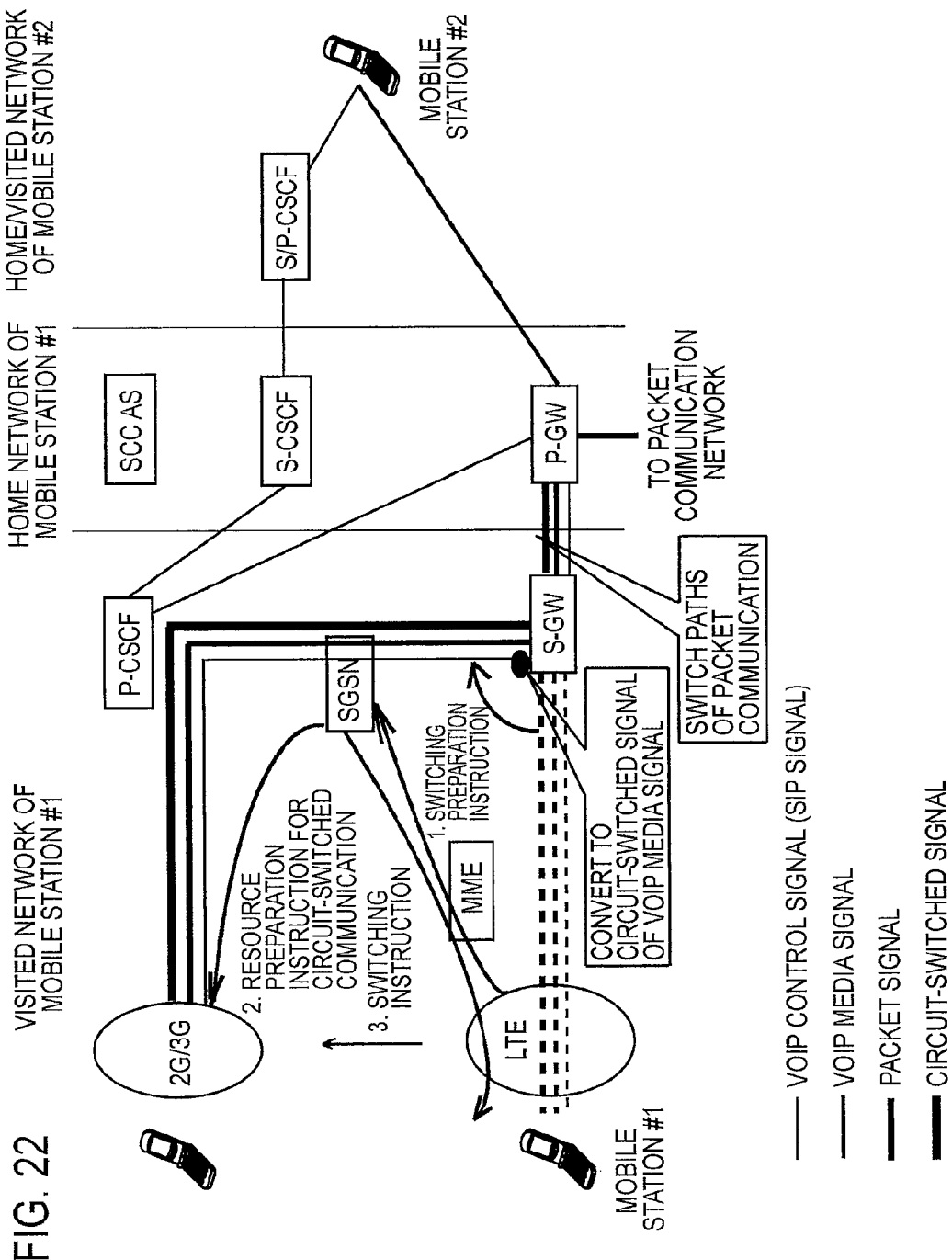
FIG. 22 is a diagram illustrating the entire configuration of a mobile communication system according to a second modification of the present invention.

With reference to FIG. 22, a mobile communication system according to a second modification of the present invention will be described. Hereinafter, the mobile communication system according to the second modification of the present invention will be described while focusing on the difference from the above-mentioned mobile communication system according to the first modification.

As described in FIG. 22, in the mobile communication system according to the present second modification, configuration is such that the VoIP control signal and the packet signal are exchanged by passing through the node SGSN.

Meanwhile, configuration is such that the circuit-switched signal is exchanged without passing through the node SGSN.

(Third Modification)

Figure 23:
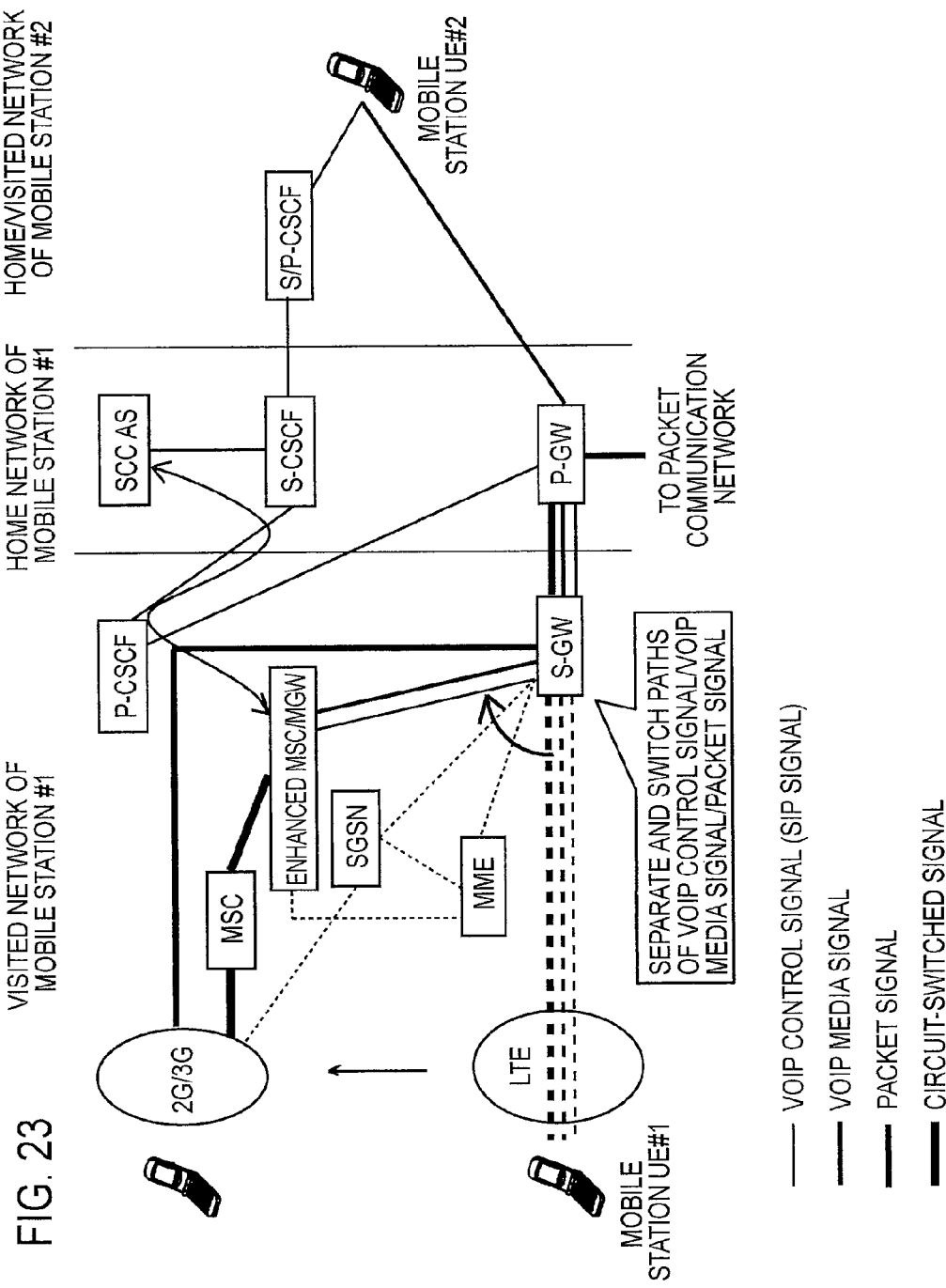
FIG. 23 is a diagram illustrating the entire configuration of a mobile communication system according to a third modification of the present invention.
Figure 24:
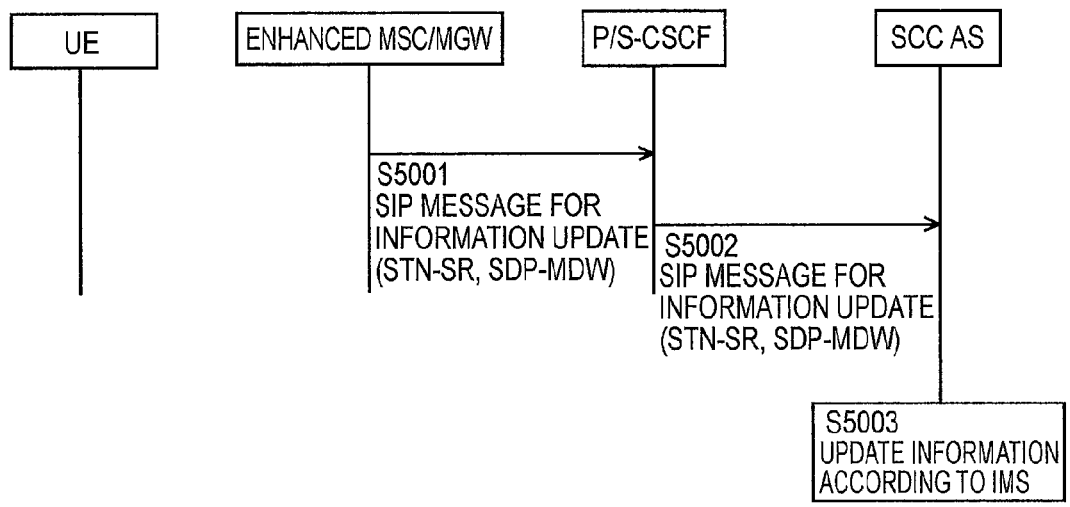
FIG. 24 is a sequence diagram illustrating an operation of the mobile communication system according to the third modification of the present invention.
Figure 25:
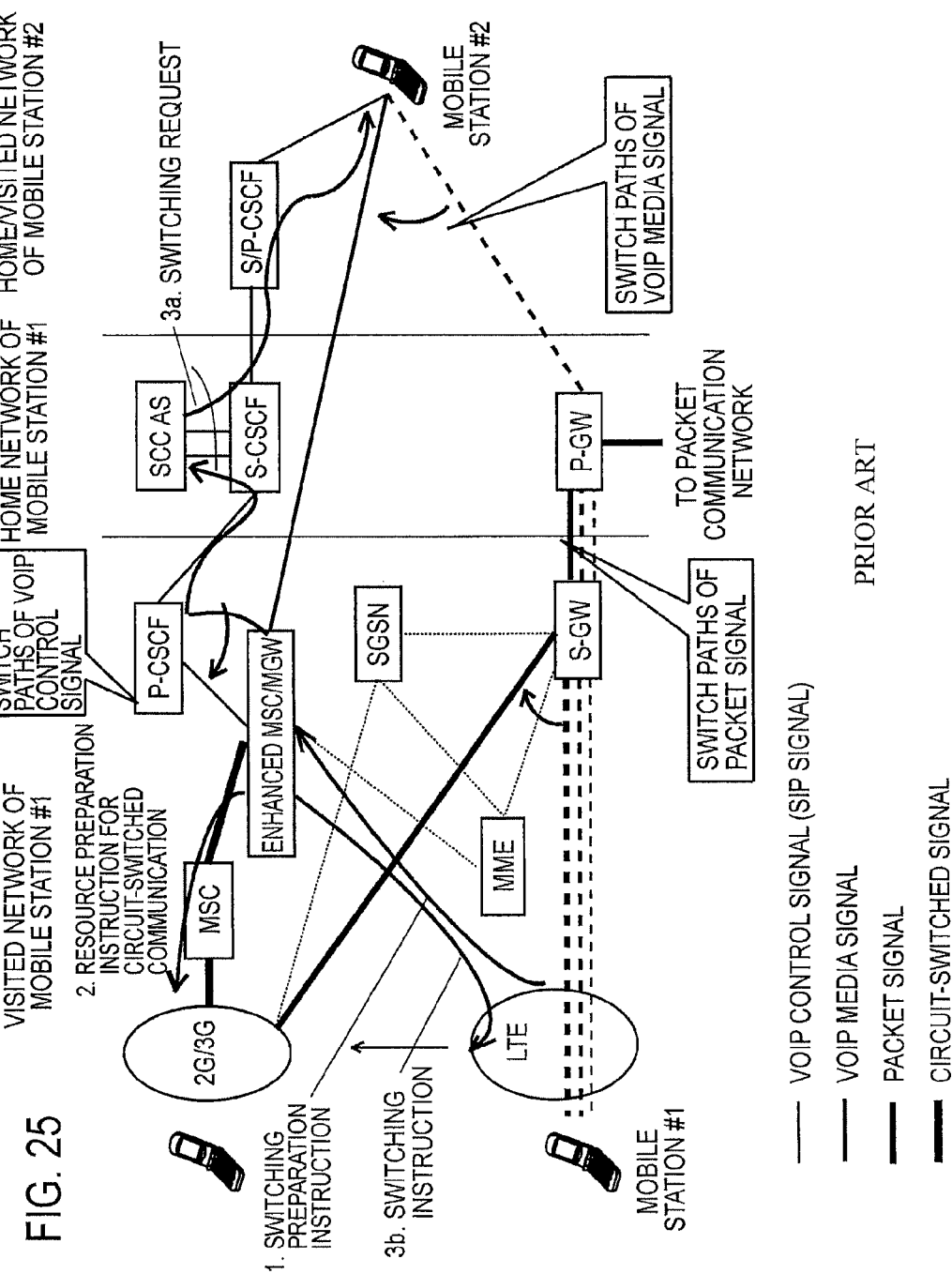
FIG. 25 is a diagram illustrating the entire configuration of a conventional mobile communication system.
Figure 26:
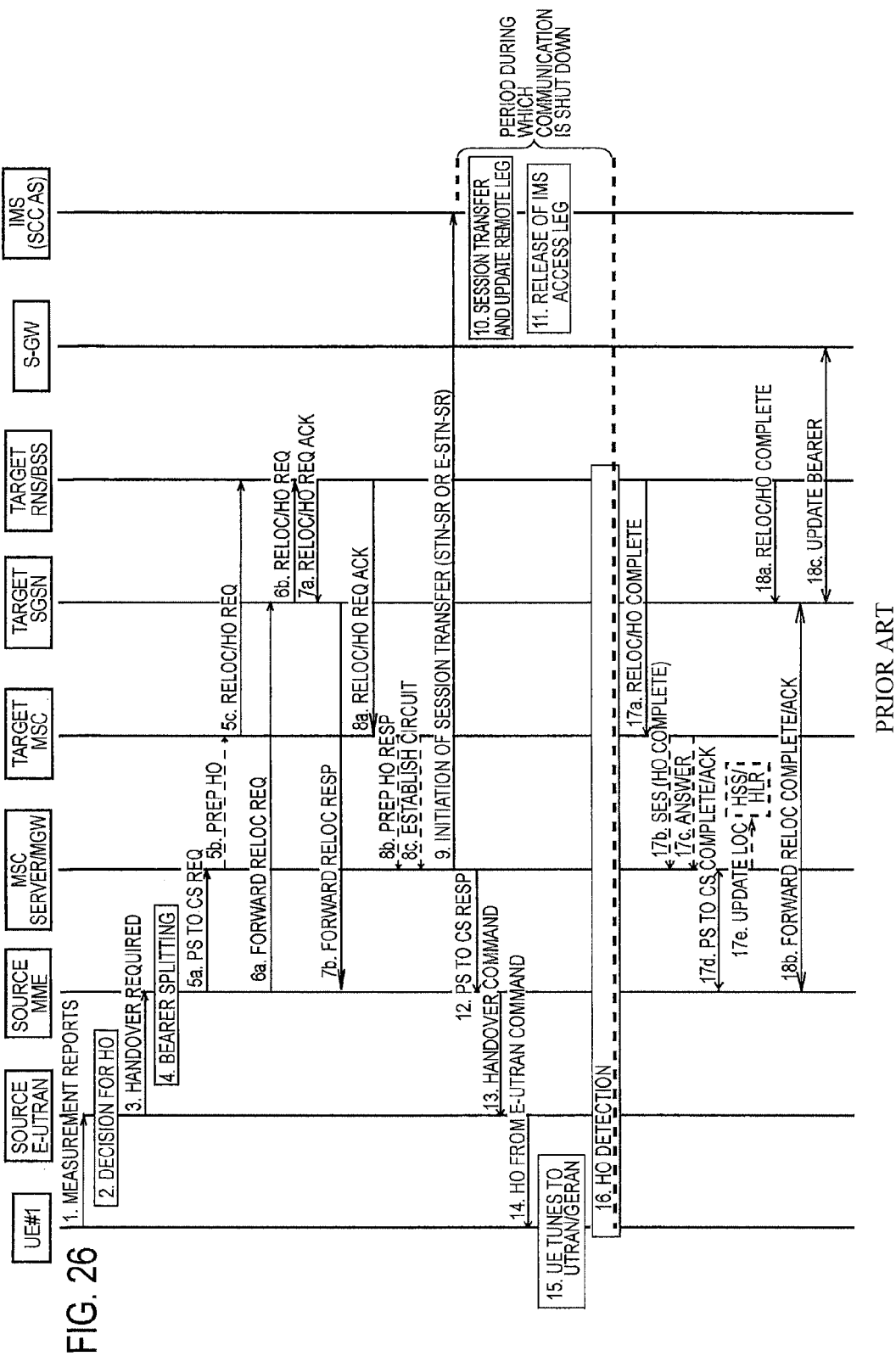
FIG. 26 is a sequence diagram illustrating an operation of the conventional mobile communication system.

With reference to FIG. 23 and FIG. 24, a mobile communication system according to a third modification of the present invention will be described. Hereinafter, the mobile communication system according to the third modification of the present invention will be described while focusing on the difference from the above-mentioned mobile communication system according to the first embodiment.

As described in FIG. 23, the mobile communication system according to the present third modification may be so configured such that, in the second communication state, the VoIP control signal including information according to the IMS may be exchanged between the enhanced MSC/MGW and the node SCC AS arranged in the home network of the mobile station UE #1 via the node P-CSCF provided in the visited network of the mobile station UE #1 and the node S-CSCF arranged in the home network of the mobile station UE #1.

For example, configuration may be such that when the first communication state is switched to the second communication state, the enhanced MSC/MGW may notify the node SCC AS arranged in the home network of the mobile station UE #1 of the information (for example, information on MS-ISDN, and the like) according to the IMS, thereby updating the information according to the IMS held by the node SCC AS.

Specifically, as illustrated in FIG. 24, when the first communication state is switched to the second communication state, the enhanced MSC/MGW transmits "SIP message for information update" including "STN-SR" and "SDP-MGW" to the node S-CSCF arranged in the home network of the mobile station UE #1 via the node P-CSCF provided in the visited network of the mobile station UE #1 in step S5001. The SIP message for information update, for example, includes "UPDATE" or "RE-INVITE".

Here, the "STN-SR" indicates a switching process from the first communication state to the second communication state, and the "SDP-MGW" indicates VoIP media information.

In step S5002, the node S-CSCF transmits the "SIP message for information update" including the "STN-SR" and the "SDP-MGW" to the node SCC AS arranged in the home network of the mobile station UE #1.

In step S5003, the node SCC AS updates the information according to the IMS held by the node SCC AS in response to the received "SIP message for information update".

Furthermore, in such a case, the node SCC AS may be configured to notify the enhanced MSC/MGW of the information according to the IMS, which is held by the node SCC AS before the first communication state is switched to the second communication state.

The characteristics of the present embodiment as described above may also be expressed as follows.

A first characteristic of the present embodiment is summarized as a mobile communication system which is provided with an LTE radio access system (a first communication scheme) not supporting circuit-switched communication, a mobile delivery network accommodating the LTE radio access system, a 2G/3G radio access system (a second communication scheme) supporting the circuit-switched communication, a 2G/3G core network and accommodating the 2G/3G radio access system, and IMS (a service control network), and is configured to switch between a first communication state and a second communication state; in the case of the first communication state, a mobile station UE #1 (a first mobile station) visits the LTE radio access system and is configured to perform voice communication between the mobile station UE #1 and a mobile station UE #2 (a second mobile station), and the configuration is such that a VoIP media signal is exchanged via the LTE radio access system and a node S-GW (a serving gateway device) arranged in a visited network of the mobile station UE #1 in the mobile delivery network and a VoIP control signal is exchanged via the LTE radio access system, the node S-GW, and the IMS between the mobile station UE #1 and the mobile station UE #2; and in the case of the second communication state, the mobile station UE #1 visits the 2G/3G radio access system and is configured to perform voice communication between the mobile station UE #1 and a mobile station UE #2, the configuration is such that a circuit-switched signal is exchanged between the mobile station UE #1 and an enhanced MSC/MGW arranged in the 2G/3G core network via the 2G/3G radio access system, the VoIP media signal is exchanged between the enhanced MSC/MGW and the mobile station UE #2 via the node S-GW, the VoIP control signal is exchanged between the enhanced MSC/MGW and the mobile station UE #2 via the node S-GW and the IMS, and the enhanced MSC/MGW converts the circuit-switched signal and a combination of the VoIP media signal and the VoIP control signal.

In the first characteristic of the present embodiment, in the case of the second communication state, configuration may be such that between the enhanced MSC/MGW and a node SCC AS arranged in the home network of the mobile station UE #1, a VoIP control signal including information according to the IMS may be exchanged.

Furthermore, a second characteristic of the present embodiment is summarized as a mobile communication system which is provided with an LTE radio access system, a mobile delivery network, a 2G/3G radio access system; a 2G/3G core network, and IMS, and which is configured to switch between a first communication state and a second communication state; in the case of the first communication state, a mobile station UE #1 visits the LTE radio access system and is configured to perform voice communication between the mobile station UE #1 and a mobile station UE #2, the configuration is such that a VoIP media signal is exchanged via the LTE radio access system and a node S-GW and a VoIP control signal is exchanged via the LTE radio access system, the node S-GW, and the IMS between the mobile station UE #1 and the mobile station UE #2; and in the case of the second communication state, the mobile station UE #1 visits the 2G/3G radio access system and is configured to perform voice communication between the mobile station UE #1 and a mobile station UE #2, the configuration is such that a circuit-switched signal is exchanged between the mobile station UE #1 and the node S-GW via the 2G/3G radio access system, the VoIP media signal is exchanged between the node S-GW and the mobile station UE #2, the VoIP control signal is exchanged between the mobile station UE #1 and the mobile station UE #2 via the 2G/3G radio access system, the node S-GW, and the IMS, and the node S-GW converts the circuit-switched signal and the VoIP media signal.

In the second characteristic of the present embodiment, in the case of the second communication state, configuration may be such that the VoIP control signal may be exchanged between the mobile station UE #1 and the mobile station UE #2 via the 2G/3G radio access system, a node SGSN (a packet mobile switching center) arranged in the 2G/3G core network, the node S-GW, and the IMS.

It is noted that the operation of the above-described the MME, SGW, PGW, P-CSCF, S-CSCF, SCC, AS, S/P-CSCF, eNodeB, SGSN, MSC or UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the MME, SGW, PGW, P-CSCF, S-CSCF, SCC, AS, S/P-CSCF, eNodeB, SGSN, MSC or UE. Further, such a storage medium or a processor may be arranged, as a discrete component, in the MME, SGW, PGW, P-CSCF, S-CSCF, SCC, AS, S/P-CSCF, eNodeB, SGSN, MSC or UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication system for realizing single radio voice call continuity (SRVCC), the mobile communication system comprising:
a first radio access network supporting packet-switched communication;
a second radio access network supporting packet-switched communication and circuit-switched communication;
a Mobility Management Entity (MME);
an enhanced Mobile Switching Center/Media Gateway (MSC/MGW); and
a gateway,
wherein a first mobile station provides the MME with an Attach Request message or a Tracking Area Update message including information on SRVCC capability of the first mobile station,
wherein the gateway is configured to switch a path for voice communications between the first mobile station and a second mobile station, from a path through the first radio access network to a path through the second radio access network in a visited network of the first mobile station, based on the SRVCC capability, and
wherein the path through the second radio access network includes a circuit-switched signal exchanged between the first mobile station and the enhanced MSC/MGW via the second radio access network and a VoIP media signal exchanged between the enhanced MSC/MGW and the second mobile station via the gateway.

2. A mobile communication method for a mobile communication system for realizing single radio voice call continuity (SRVCC), the mobile communication method comprising:
providing, by a first mobile station, a Mobility Management Entity (MME) with an Attach Request message or a Tracking Area Update message including information on SRVCC capability of the first mobile station; and
switching, by a gateway, a path for voice communications between the first mobile station and a second mobile station, from a path through a first radio access network supporting packet-switched communication to a path through a second radio access network supporting packet-switched communication and circuit-switched communication in a visited network of the first mobile station, based on the SRVCC capability,
wherein the path through the second radio access network includes a circuit-switched signal exchanged between the first mobile station and an enhanced Mobile Switching Center/Media Gateway (MSC/MGW) via the second radio access network and a VoIP media signal exchanged between the enhanced MSC/MGM and the second mobile station via the gateway.

3. A mobile station for realizing single radio voice call continuity (SRVCC), comprising:
a memory storing instructions; and
at least one processor configured to process the instructions to:
control for performing a handover from a first radio access network supporting packet-switched communication to a second radio access network supporting packet-switched communication and circuit-switched communication, and
provide a mobility management entity (MME) with an Attach Request message or a Tracking Area Update message including information on SRVCC capability of the mobile station,
wherein a path for voice communications between the mobile station and a further mobile station, is switched, by a gateway, from a first path through the first radio access network to a second path through the second radio access network in a visited network of the mobile station based on the SRVCC capability, the second path including a circuit-switched signal exchanged between the mobile station and an enhanced Mobile Switching Center/Media Gateway (MSC/MGW) via the second radio access network and a VoIP media signal exchanged between the enhanced MSC/MGW and the further mobile station via the gateway.

4. A mobile communication method for a mobile station for realizing single radio voice call continuity (SRVCC), comprising:
performing a handover from a first radio access network supporting packet-switched communication to a second radio access network supporting packet-switched communication and circuit-switched communication; and
providing a mobility management entity (MME) with an Attach Request message or a Tracking Area Update message including information on SRVCC capability of the mobile station,
wherein a path for voice communications between the mobile station and a further mobile station, is switched, by a gateway, from a first path through the first radio access network to a second path through the second radio access network in a visited network of the mobile station based on the SRVCC capability, the second path including a circuit-switched signal exchanged between the mobile station and an enhanced Mobile Switching Center/Media Gateway (MSC/MGW) via the second radio access network and a VoIP media signal exchanged between the enhanced MSC/MGW and the further mobile station via the gateway.

* * * * *